United States Patent [19]

Mittal

[11] Patent Number: 4,782,878

[45] Date of Patent: Nov. 8, 1988

[54] TIRE INFLATING AND DEFLATING SYSTEM AND APPARATUS

[75] Inventor: Chander P. Mittal, Rowland Heights, Calif.

[73] Assignee: Tire Inflation Systems, Corp., Eastlake, Ohio

[21] Appl. No.: 943,068

[22] Filed: Dec. 18, 1986

[51] Int. Cl.[4] .................... B60C 23/10; B60C 29/00
[52] U.S. Cl. .................... 152/417; 152/427; 137/225; 141/38; 73/146.5
[58] Field of Search ............ 152/415, 416, 417, 427; 137/224, 225; 73/146.2, 146.5; 141/38; 303/9, 20; 364/510, 558

[56] References Cited

U.S. PATENT DOCUMENTS

| | | | |
|---|---|---|---|
| 1,827,662 | 10/1931 | Maas | 152/416 |
| 2,146,102 | 2/1939 | Wiegand | 152/416 |
| 2,213,539 | 9/1940 | Wiegand | 152/416 |
| 2,685,906 | 7/1954 | Williams | 152/417 |
| 2,693,841 | 11/1954 | Webster, Jr. | 152/417 |
| 2,944,579 | 7/1960 | Kamm et al. | 152/416 |
| 2,976,906 | 3/1961 | Kamm et al. | 152/417 |
| 2,989,999 | 6/1961 | Holbrook et al. | 152/416 |
| 3,099,309 | 7/1963 | Horta et al. | 152/416 |
| 3,102,573 | 9/1963 | Van Winsen et al. | 152/416 |
| 4,313,483 | 2/1982 | Brockmann | 152/416 |
| 4,421,151 | 12/1983 | Stumpe | 152/417 |
| 4,456,038 | 6/1984 | Gwaltney et al. | 137/224 |
| 4,498,515 | 2/1985 | Holtzhauser et al. | 152/417 |
| 4,619,303 | 10/1986 | Bryan et al. | 152/416 |
| 4,640,331 | 2/1987 | Braun et al. | 152/417 |
| 4,641,698 | 2/1987 | Bitonti | 152/416 |
| 4,678,017 | 7/1987 | Schultz | 137/225 |

Primary Examiner—Benoit Castel
Assistant Examiner—Richard D. Jordan
Attorney, Agent, or Firm—Body, Vickers & Daniels

[57] ABSTRACT

A system for inflating and deflating pneumatic tires of a vehicle through pneumatically actuated tire isolating valves which isolate air under pressure in the tires from the system comprises electronically controlled valves for achieving opening of the tire isolating valves, inflating or deflating of the vehicle tires and the quick exhausting of air under pressure from the system when the desired tire pressure is reached so as to immediately enable closure of the tire isolating valves to assure obtaining the desired pressure in the tires. Optimum rates of inflating and deflating together with accuracy in obtaining a desired tire pressure are achieved through a unique tire isolating valve construction and electronic controlled circuitry by which signals corresponding to desired and existing tire pressures are electronically compared to provide output signals by which the inflating, deflating and exhaust functions are controlled.

29 Claims, 12 Drawing Sheets

FIG. I

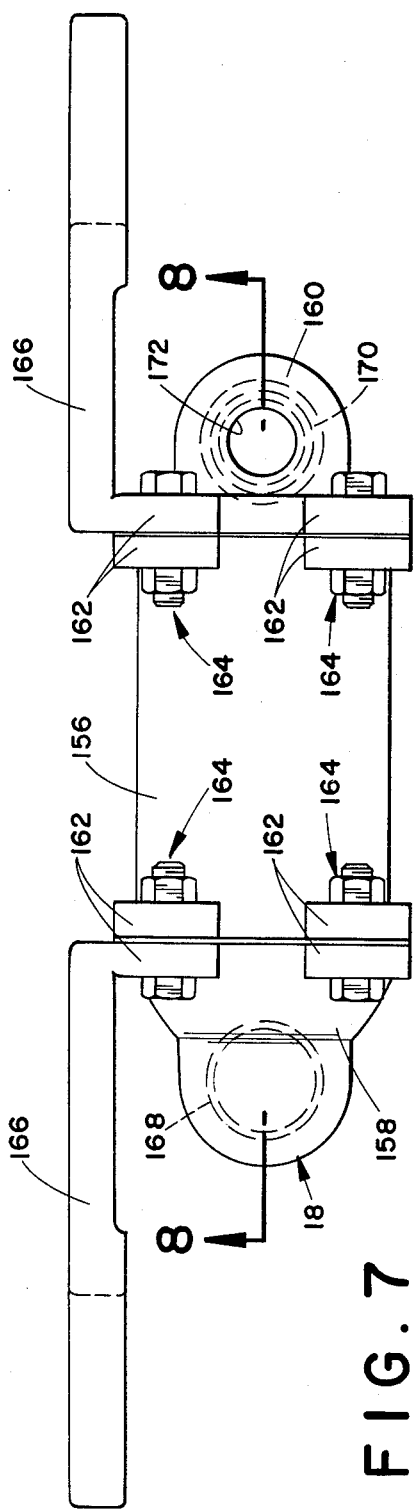
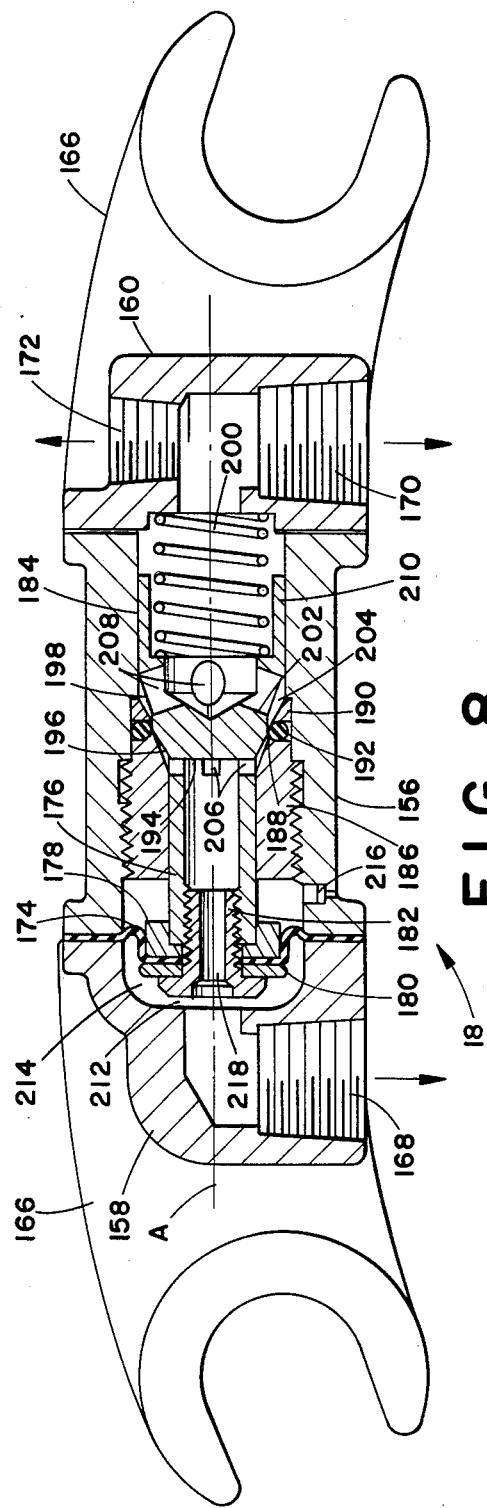

TIRE INFLATING AND DEFLATING SYSTEM AND APPARATUS

BACKGROUND OF THE INVENTION

This invention relates to the art of vehicles having pneumatic tires and, more particularly, to improvements in connection with systems and apparatus for selectively inflating, deflating and checking vehicle tire pressure.

It is of course well known to provide vehicles with onboard systems for achieving inflating and/or deflating of vehicle tires and/or the checking of the pressure of air in the vehicle tires. Such systems generally include a source of air under pressure and manually operable controls for selectively increasing or decreasing an existing tire pressure and/or checking to determine the magnitude of the existing tire pressure. The ability to selectively increase or decrease tire pressure is desirable in connection with optimizing operation of the vehicle under variable and changing conditions including, for example, weather, vehicle load, terrain and vehicle speed. It is likewise desirable in connection with such capability to provide for isolating the air under pressure in each vehicle tire from the remainder of the system so that a problem such as a leak encountered in connection with one tire does not affect the air pressure in the other vehicle tires. Further in connection with such a tire isolating feature, an air line or lines from the system's source of air under pressure extends to a vehicle tire generally through the fixed axle upon which the tire and its associated wheel assembly are rotatably mounted and across a sealing arrangement between the fixed and rotating parts, and the tire isolating valve is preferably between the sealing arrangement and tire so that the sealing arrangement is not subjected to system air under pressure other than at times of operation of the system to achieve inflation, deflation or pressure checking.

Problems encountered in connection with systems of the foregoing character heretofore available have included the inability to accurately obtain a predetermined desired tire pressure during inflation or deflation, the inability to achieve inflation or deflation from one tire pressure to another with accuracy and within a desired time period, and the inability to provide a system which is efficient in operation both from the standpoint of minimizing operator assistance and obtaining optimum inflating and deflating rates and accuracy with respect to the tire pressure sought. Accuracy in connection with obtaining a desired tire pressure has been difficult to achieve for a number of reasons including, for example, reliance on manually actuable controls for initiating and terminating an inflating or deflating process in connection with a visual observation of tire pressure during the process, and/or the use of flow control valves which are slow to close upon termination of the process whereby air under pressure from the tires is lost before the valves close. These factors require anticipation and guess work on the part of the operator in an effort to compensate for such air pressure loss and/or to terminate the inflating or deflating operation when the desired pressure is reached.

Efforts to improve accuracy with respect to obtaining a desired tire pressure have included the use of complex flow control valves and/or slow flow rates between the source of air under pressure and the vehicle tires. However, such efforts result in the inability to achieve tire inflating or deflation within a given time period and which time period may be a critical requirement in connection with acceptance of a tire inflating and deflating system. Moreover, complex flow control valves or valve arrangements are undesirably expensive both to manufacture and to maintain. Such slow inflating or deflating rates and/or requirements for operator attention and/or assistance in connection with controlling the inflating or deflating process result in a less than desirable efficiency in connection with use of the system as well as the inability to continuously achieve accurate pressures in connection with use of the system.

SUMMARY OF THE INVENTION

In accordance with the present invention, a tire inflating, deflating and pressure checking system and apparatus is provided by which the foregoing and other disadvantages of systems heretofore available are minimized or overcome. More particularly in this respect, the only operator assistance required in connection with operation of a system in accordance with the present invention is the selecting of a desired tire pressure and initiation of system operation. Thereafter, the system is capable of determining whether tire inflation or deflation is required in connection with the selected pressure. If so, the system operates to automatically achieve the inflation or deflation and to terminate inflation or deflation when the selected tire pressure is reached.

In connection with a preferred embodiment, the operator merely depresses a start button to achieve a pressure checking operation, or repositions an adjustable pressure selector and then depresses the start button to achieve an inflating or deflating operation. Accordingly, it will be appreciated that if the operator is driving the vehicle when it is desired to check or adjust the tire pressure, the vehicle does not have to be stopped to enable the driver to control and/or monitor the inflating or deflating process and, in connection with operation of the vehicle, the operator has a minimum period of distraction to initiate operation of the system. Furthermore, the system provides optimum flow rates in connection with both inflating and deflating the tire, thus minimizing the time required to change from one tire pressure to another, and termination of the inflating or deflating process is achieved in a manner which assures accuracy with respect to obtaining the desired tire pressure. Preferably, the start button is one of three selectable buttons enabling operation of the system in connection with only the front tires of a vehicle, only the rear tires thereof, or both the front and rear tires simultaneously.

In connection with tire inflating or deflating, the foregoing attributes are achieved in part in accordance with the present invention by providing the control of inflating and deflating valves through a control circuit operable to differentiate between a demand to inflate or deflate a tire, to open the appropriate one of the inflating and deflating valves in response to such demand, to continuously monitor tire pressure as the latter approaches a selected level, and to immediately and automatically terminate the inflating or deflating process when the selected pressure is reached and in a manner which effects immediate isolation of the tire from the system with the desired air pressure therein. More particularly, the control circuit is operable to determine an existing tire pressure, to compare the existing tire pressure with a tire pressure selected by the vehicle operator and if the latter is different from the existing pressure, to open the appropriate one of the inflating and deflating valves in response to a control signal corresponding to the difference between the two pressures. The existing pressure continuously changes during the inflating or deflating process and is continuously monitored and compared with the selected pressure, and when the two pressures are equal the control circuit is operable to immediately and automatically cause the open valve to close.

Each vehicle tire has a normally closed tire isolating valve associated therewith and which is open during the inflating, deflating and pressure checking operations, and the control circuit is operable to effect substantially instantaneous closure of the tire isolating valve at the conclusion of the operation, whereby the existing tire pressure is accurately maintained or the newly selected tire pressure is accurately obtained. In a preferred embodiment, the tire isolating valve is pneumatically actuated between its open and closed positions, and the control circuit is operable upon initiating system operation to cause opening of the valve and, when the tire pressure is at the desired level, to open an exhaust valve upstream of the tire isolating valve. When the exhaust valve opens air under pressure in the system is immediately dumped or exhausted to atmosphere causing the tire isolating valve to substantially immediately close. Preferably, the control circuit is a small electronic module located in the vehicle cab and having a control panel readily accessible to the operator or another occupant, and the flow control valves are in a small pneumatic control module appropriately located elsewhere on the vehicle chassis for convenience with respect to connecting the latter module with a source of air under pressure on the vehicle and the tires thereof.

In accordance with another aspect of the invention, an improved pneumatically actuated tire isolating valve is provided which optimizes achieving desired tire inflating and deflating rates and instantaneous closing following inflation, deflation and pressure checking operations so as to obtain and maintain a desired pressure in the vehicle tire. These attributes are achieved in part by providing for the valve to have a single flow passageway therethrough utilized both for actuation of the valve and air flow therethrough. Further, the flow control portion of the valve has upstream and downstream areas with respect to the direction of flow of air through the valve from the source to the tire, which areas are acted upon by air under pressure against the corresponding side of the valve, and the upstream area of which is larger than the downstream area. The latter areas, and the effective area of the passageway through the valve at the upstream end thereof are dimensionally interrelated in a manner which provides for the valve to be substantially totally operable by air under pressure, utilizing a small spring force in the closing direction primarily to assure positive closing and to overcome any tendency of the valve to stick in its open position. The dimensional interrelationship provides for the valve to be opened by air under pressure in the system, to remain open during an ensuing pressure checking, inflating or deflating operation, and to instantaneously close upon opening of the system exhaust valve without any substantial loss of air from the tire, whereby the desired tire pressure is accurately achieved. In connection with inflation and deflation, the dimensional relationship provides for optimum air flow in both directions across the valve.

It is accordingly an outstanding object of the present invention to provide improvements in connection with systems and apparatus for inflating, deflating and checking the pressure of air in pneumatic tires of a vehicle.

Another object is the provision of systems and apparatus of the foregoing character which enable accurately obtaining and maintaining a predetermined desired pressure in the tires of a vehicle.

A further object is the provision of systems and apparatus of the foregoing character which enable achieving inflation or deflation from one tire pressure to another with accuracy and within desired inflating and deflating times.

Yet another object is the provision of systems and apparatus of the foregoing character which are compact, efficient in operation, and require minimal operator assistance in connection with operation of the system.

Still a further object is the provision of systems and apparatus of the foregoing character which, upon actuation, are automatically operable to determine the existing tire pressure, to compare the existing pressure with a desired pressure, to effect inflating, deflating or pressure checking procedures in response to such comparison, and to automatically stop the inflating, deflating or pressure checking process when the compared pressures are equal.

Another object is the provision of systems and apparatus of the foregoing character wherein each tire of a vehicle is isolated from the system at the end of each mode of operation, thus to depressurize the seal arrangement between the vehicle axle and wheel assembly and unload the seal elements, thereby reducing wear and prolonging the life of the seal elements.

Yet another object is the provision of an improved pneumatically actuated tire isolating valve for use in a vehicle tire inflating and deflating system.

Still another object is the provision of a pneumatically actuated tire isolating valve having fluid flow responsive characteristics enabling substantially instantaneous closing thereof to obtain and maintain a desired tire pressure upon termination of system operation.

BRIEF DESCRIPTION OF THE DRAWINGS

The foregoing objects, and others, will in part be obvious and in part pointed out more fully hereinafter in conjunction with the written description of preferred embodiments of the invention shown in the accompanying drawings in which:

FIG. 7 is a plan view of a preferred tire isolating valve in accordance with the present invention;

FIG. 8 is a sectional elevation view of the valve taken along line 8—8 in FIG. 7;

DESCRIPTION OF PREFERRED EMBODIMENTS

Figure 1:
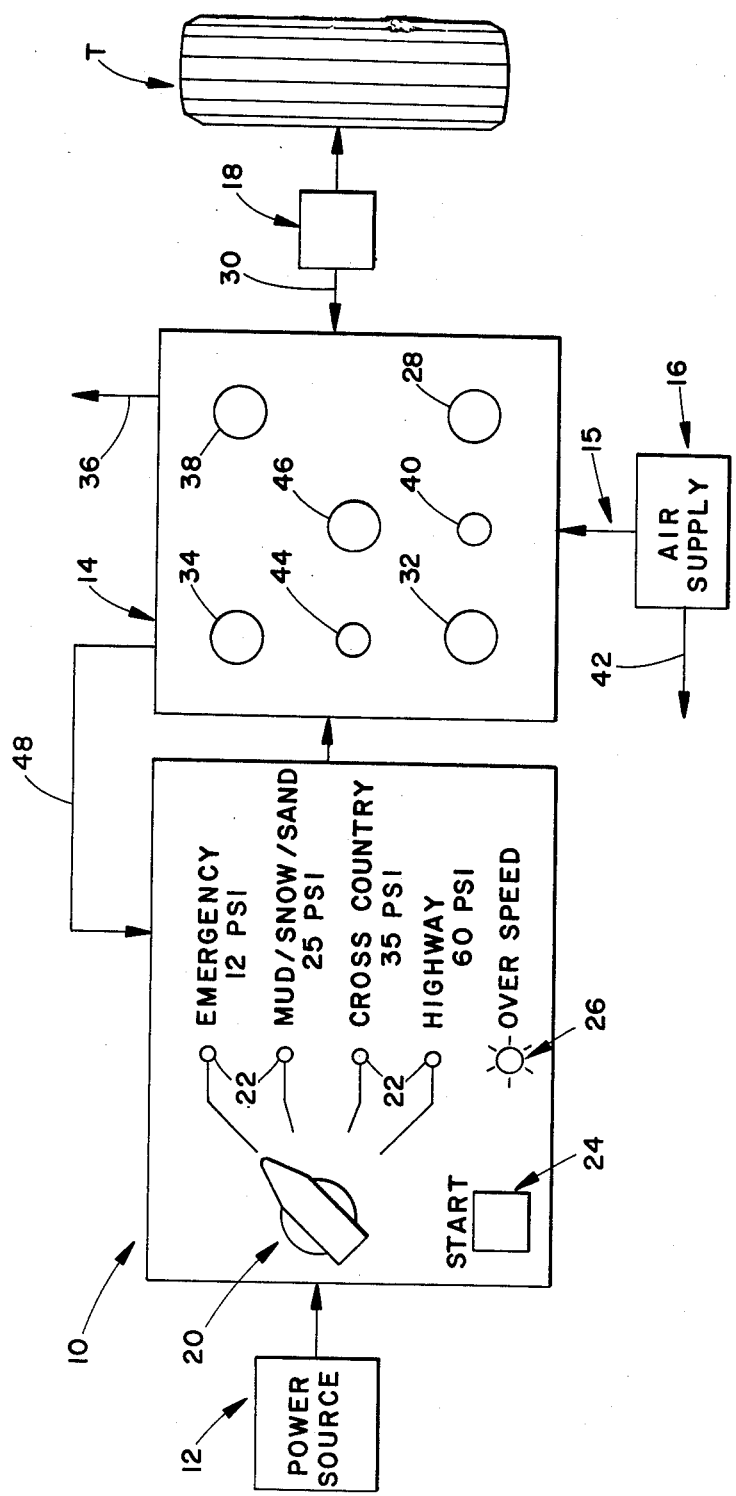
FIG. 1 is a schematic representation of the component parts of tire inflating and deflating apparatus in accordance with the present invention.

Referring now in greater detail to the drawings wherein the showings are for the purpose of illustrating preferred embodiments of the invention only and not for the purpose of limiting the invention, it will be seen in FIG. 1 that the major component parts of a tire inflating, deflating and pressure checking system in accordance with the present invention include an electronic control module 10 connected to a suitable DC power source 12 such as the vehicle battery, a pneumatic control module 14 having an air inlet passageway connected to supply line 15 from a source of air under pressure 16 such as an onboard air supply for the vehicle brakes, the vehicle tires T, only one of which is shown in FIG. 1, and a tire isolating valve 18 between the tire and pneumatic control module 14. Electronic control module 10 is adapted to be mounted in the cab of a vehicle and comprises a control panel including a pressure selector component 20 which is manually displaceable between a plurality of selectable positions each corresponding to a different available pressure for the vehicle tires. As an example for purposes of the embodiment disclosed herein, source 16 is adapted to supply air at 100 psi, and the selectable tire pressures are 12 psi, 25 psi, 35 psi and 60 psi. The selectivity with respect to different tire pressures enables optimizing the performance of the vehicle under different terrain conditions. To eliminate reliance on the judgment of the vehicle driver or other occupant of the vehicle cab with respect to selecting the most appropriate pressure, the selectable pressures are preferably identified on the control panel by words such as "Emergency", "Mud/Snow/Sand", "Cross Country" and "Highway", either alone or in conjunction with the corresponding pressures as shown in FIG. 1. Each of the selectable pressure positions has an indicator light 22 associated therewith and which, as explained more fully hereinafter, is energized upon completion of a cycle of operation of the system to visually indicate such completion and, thereafter, the existing tire pressure. The control panel further includes a depressable start button 24 by which the operator is able to initiate a pressure checking, inflating or deflating operation as explained hereinafter, and an over-speed light 26 providing the driver with a visual indication that the vehicle is traveling at a ground speed greater than that intended with the then existing tire pressure. As will be explained hereinafter, if the high speed is maintained for a predetermined period of time, the system automatically initiates a tire inflating operation.

Pneumatic control module 14 includes a plurality of flow control valves which are operationally controlled by the electronic controller as described more fully hereinafter to achieve the tire inflating, deflating and pressure checking operations. As schematically shown in FIG. 1, these valves include a normally closed preliminary flow control valve 28 which is operable to initially introduce air under pressure into the system at a restricted flow rate from source 16 to open tire isolating valve 18 which is in flow communication with the pneumatic control module and tire T through a flow line 30. The valves also include a normally closed tire inflating valve 32 which is opened to provide for the flow of air under pressure from source 16 to tire T through valve 18 during a tire inflating operation, and a normally closed tire deflating valve 34 which is opened to exhaust air at a restricted flow rate from tire T and across valve 18 to atmosphere through a vent 36, during a tire deflating operation. The flow control valves further include a normally open system exhaust valve 38 which is closed during tire inflating, deflating and pressure checking operations and opens upon completion of each operation to quicky exhaust air under pressure from the system upstream of tire isolating valve 18 at a rate to promote instantaneous closing thereof to obtain the desired air pressure in the tire.

The pneumatic control module further includes a pressure responsive priority device 40 which functions when the pressure of air from source 16 falls below a given level to preclude the flow of air from source 16 to the pneumatic control module. Further in this respect, the source of air under pressure for tire inflating and deflating systems is often provided by an onboard source of air under pressure for operating the vehicle brakes, the air supply is indicated by arrow 42 in FIG. 1. It will be appreciated that the supply of air under pressure to the brake system of the vehicle has priority over the supply of air to the tire inflating and deflating system, and device 40 operates as explained hereinafter to assure such priority. Preferably, the pneumatic control module is also provided with a pressure responsive relief valve 44 which opens the system to atmosphere through vent 36 at a given high pressure above which the tires are not to be inflated. Finally, the pneumatic control module includes a pressure sensing transducer 46 which is operable during inflating, deflating and pressure checking operations to feed a signal back to electronic control module 10, as represented by line 48, and which signal is indicative of the existing tire pressure. As will become apparent hereinafter, such feedback signal is continuously compared in electronic control module 10 with a signal representative of a selected tire pressure, and a control signal is generated in response to such comparison to control system operation.

Figure 2:
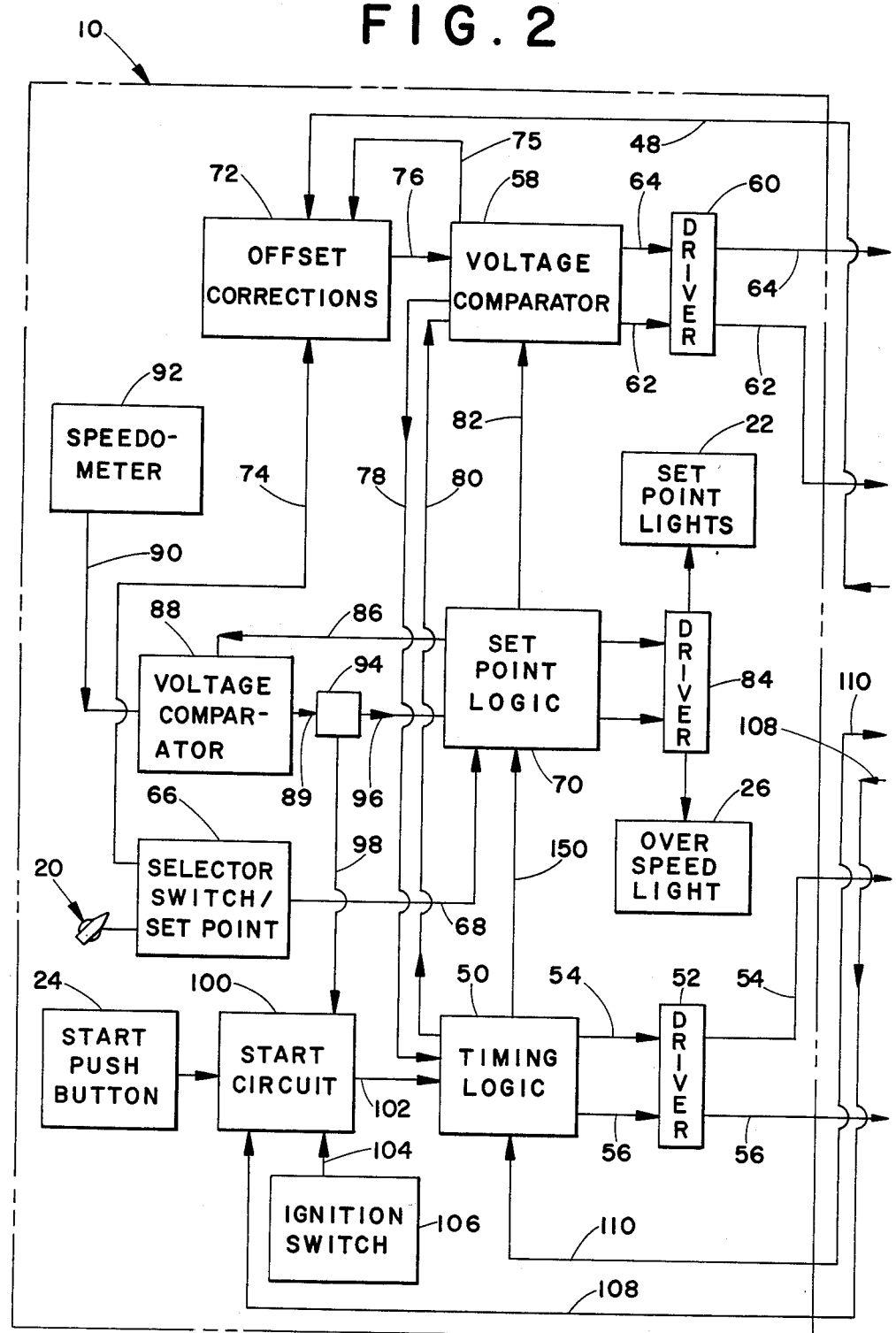
FIGS. 2 and 2A are together a schematic representation of the component parts of the electronic and pneumatic control modules of the apparatus.
Figure 2A:
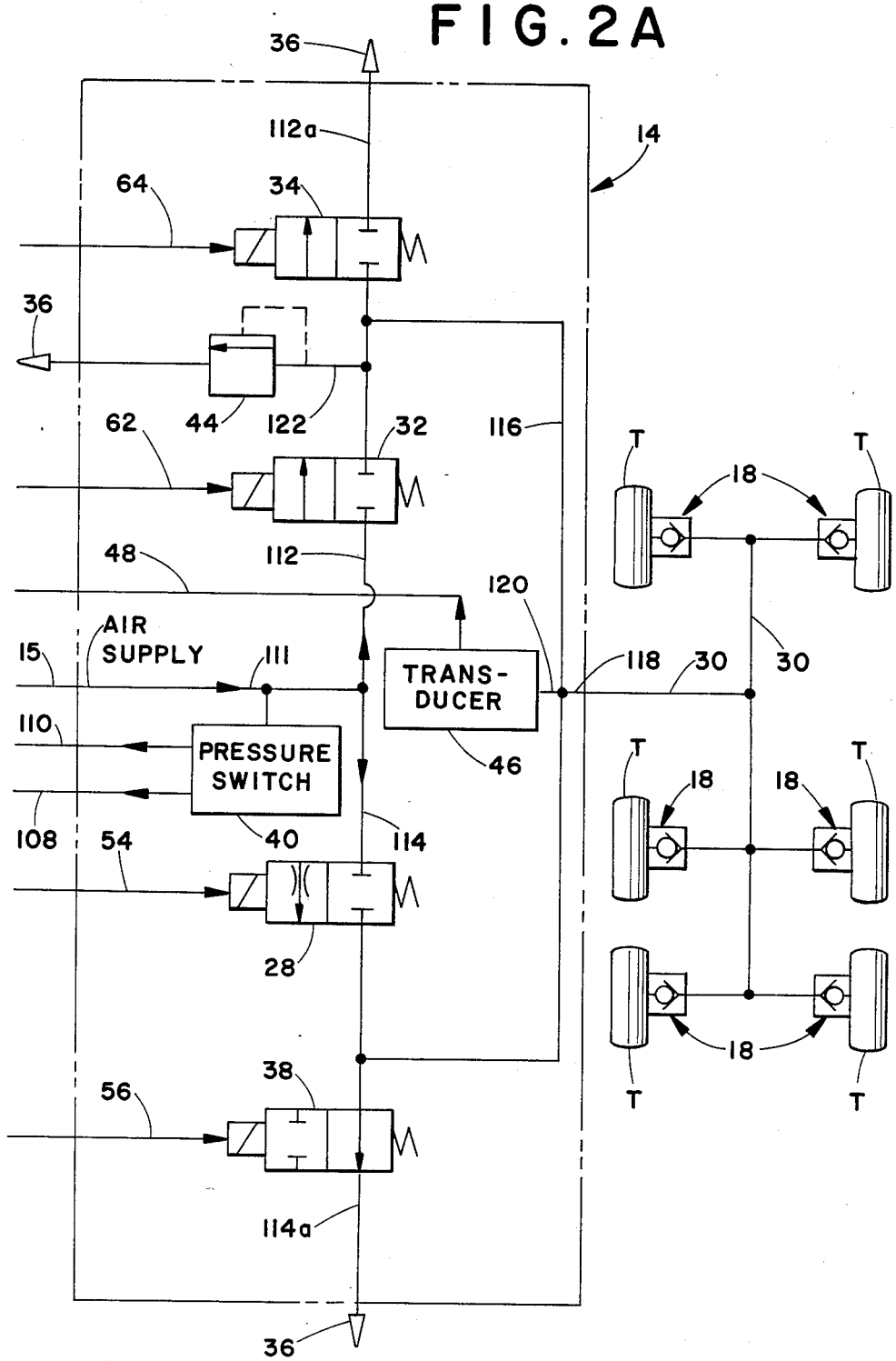

Referring now to FIGS. 2 and 2A which are to be considered side-by-side and wherein the component parts of the electronic control module and pneumatic control module are schematically illustrated, the preliminary control valve 28, inflate valve 32 and deflate valve 34 are normally closed solenoid valves electrically actuated to their open position and spring biased to their closed position, and exhaust valve 38 is a normally open solenoid valve electrically actuated to its closed position and spring biased to its open position.

Actuation of preliminary control valve 28 and exhaust valve 38 is controlled by a timing logic circuit 50 in electronic controller 10 through a driver 52. Timing logic circuit 50 is comprised of a dual one shot CD4538 and dual flip-flop CD4013 available from RCA Corp. and provides a timed output 54 through driver 52 to preliminary control valve 28 and an output 56 through driver 52 to exhaust valve 38. Actuation of inflate valve 32 and deflate valve 34 is controlled by a voltage comparator 58 in the electronic controller through a driver 60. Voltage comparator 58 is a quad voltage comparator CA339 available from RCA Corp. and provides an output 62 through driver 60 to inflate valve 32 or an output 64 through the driver to deflate valve 34.

The outputs of voltage comparator 58 are control signals derived from a comparison of an input voltage signal representing a selected tire pressure and an input voltage signal from transducer 46 representing the existing tire pressure during operation of the system. The magnitude of the first of these input signals is determined by the position of selector component 20 relative to the selectable settings therefor on the control panel. In this respect, selector component 20 is part of a selector switch setpoint circuit 66 having an output 68 to a setpoint logic circuit 70 and the magnitude of which output 68 is determined by and different for each position of selector 20 and thus each selectable tire pressure. The input signal to voltage comparator 58 representing the existing tire pressure is the output 48 of pressure transducer 46, and output 48 is preferably transmitted to the voltage comparator through an offset correction circuit 72. Offset correction circuit 72 comprises diodes IN914 and enables adjustment of the transducer output to compensate for certain pressure differences occuring in the system during the different modes of operation thereof, as will become more apparent hereinafter, and to compensate for environmental conditions. The adjustment to compensate for such factors is different for each of the tire pressures selectable through displacement of selector component 20, whereby the selector switch setpoint input circuit 66 has an output 74 to offset correction circuit 72 of a magnitude depending on the tire pressure selected by the vehicle operator. Further, for the reason set forth hereinafter, comparator 58 has an output 75 to offset correction circuit 72. The offset correction circuit has an output 76 to voltage comparator 58 providing optimum accuracy with respect to representing the actual existing tire pressure during inflating, deflating and pressure checking operations.

Voltage comparator 58 has an output 78 to timing logic circuit 50, and the latter has an output 80 to the comparator. As will become apparent hereinafter, output 80 switches the comparator on after a predetermined period of time, and output 78 is generated in response to the existing and selected tire pressure being equal and controls timing logic circuit 50 to terminate the system operation. Setpoint logic circuit 70 is a four stage shift register CD4035 available from RCA Corp. and provides an output 82 to voltage comparator 58 representative of the selected tire pressure and based on input 68 thereto from selector switch setpoint circuit 66 except, as mentioned hereinafter, in connection with an overspeed condition. The setpoint logic circuit 70 also has outputs through a driver 84 to indicator lights 22 and 26 on the control panel, and an output 86 to a voltage comparator 88 corresponding to comparator 58 identified herein. Comparator 88 also receives an output signal 90 representative of vehicle speed as measured by a speedometer input device 92. Output 86 is representative of the maximum speed at which the vehicle should travel with the tire pressure for which selector component 20 is set and, as set forth more fully hereinafter, signals 86 and 90 are compared in voltage comparator 88 and when input 90 exceeds input 86 the comparator has an output 89 to a timer 94 which has outputs 96 and 98 to setpoint logic circuit 70 and a start circuit 100, respectively. Timer 94 is a binary ripple counter CD4060 available from RCA Corp. and start circuit 100 is a dual one shot CD4538 available from RCA Corp. Comparator 88, speedometer input device 92, timer 94 and start circuit 100 operate as set forth more fully hereinafter to increase tire pressure in response to an overspeed condition. Start circuit 100 is actuated by pushbutton 24 on the control panel and provides an output 102 to timing logic circuit 50 which initiates operation of the system. Start circuit 100 also receives an input 104 from the vehicle ignition switch 106 for the purpose set forth hereinafter, and receives an input 108 from priority component 40 located in pneumatic control module 14. In the preferred embodiment priority component 40 is a pressure switch which operates for the purpose set forth hereinafter to provide input 108 to start circuit 100 and to provide an input 110 to timing logic circuit 50.

With further regard to FIGS. 2 and 2A and pneumatic control module 14, it will be appreciated that air under pressure from source 16 flows through line 15 to an inlet passageway 111 in the module and across pressure switch 40 connected to the latter passageway and into branch passageways 112 and 114. Branch passageways 112 and 114 have corresponding ends 112a and 114a communicating with a common vent or exhaust line which, for purposes of clarity, is not shown in FIG. 2A and is represented therein by numeral 36 corresponding to the vent or exhaust designation in FIG. 1. Inflate and deflate valves 32 and 34 are connected in series in passageway 112, and preliminary control valve 28 and exhaust valve 38 are connected in series in passageway 114. A flow passageway 116 is connected to each of the branch passageways 112 and 114 intermediate the pair of valves therein and provides a common outlet passageway 118 connected to flow line 30 leading to the vehicle tires and the tire isolating valves 18 associated therewith. Transducer 46 is connected to passageway 116 by a branch 120, and pressure relief valve 44 is connected to passageway 112 between valves 32 and 34 by means of a branch 122. The outlet side of relief valve 44 is connected to the common vent or exhaust passageway which, as in connection with the branch passageway ends 112a and 114a is represented by numeral 36. In FIG. 2A, the vehicle is schematically illustrated as having six tires T, and flow line 30 is a common flow line by which air flows to and from the tires across the corresponding tire isolating valves 18.

Tire isolating valves 18 are pneumatically actuated poppet type valves, a preferred embodiment of which is described in detail hereinafter, and each of which valves as schematically illustrated in FIGS. 3-6 of the drawing is mounted on the rotating portion of the wheel assembly 124 for the corresponding tire T. More particularly in this respect, wheel assembly 124 includes a rotatable hub and tire rim assembly 126 in which valve 18 is mounted and which supports the inflatable tire T. The hub and tire rim assembly includes an annular sleeve 128 rotatable therewith about a sleeve 130 which is fixed to the non-rotatable vehicle axle spindle housing 132. A drive spindle, not shown, extends through housing 132 and is rotatably supported therein and connected at its outer end to wheel assembly 126 to drive the latter. The corresponding end of air passageway 30 is connected to a passageway 134 extending through sleeve 130 and opening radially into the annular space 136 between sleeves 128 and 130 and which space 136 is sealed by axially spaced apart seal members 138 and 140 to provide an annular air pressure chamber between sleeves 128 and 130. A passageway 142 communicates the pressure chamber 136 with the upstream end of valve 18 with respect to the direction of flow of air therethrough toward tire T, and a passageway 144 communicates the downstream side of the valve with the interior of the tire. Preferably, passageway 144 leading to tire T includes a branch 144a provided exteriorly of the rim with a standard check valve 145 which, in a well known manner, provides the tire with a valve stem enabling inflating through a hose or the like and deflation by manual displacement of the check valve. It will be appreciated that the particular structure of the wheel assembly will vary from one vehicle model to another as well as between the front and rear axle and drive assemblies of the same vehicle, whereby the foregoing description is merely intended to be exemplitive of the general configuration of such wheel assembly and the relationships between the latter and a tire isolating valve associated therewith.

Tire isolating valve 18 is normally closed and is adapted to be opened and to remain open during pressure checking, inflating and deflating operations of the system and to quickly close upon termination of each such operation. Basically in this respect, valve 18 has an upstream end 146 and a downstream end 148, the latter of which is constantly exposed to the pressure of air in tire T to maintain the valve closed when the system is not in operation. Upstream end 146 has a larger surface area than end 148 and, when exposed to air under pressure during system operation, is adapted to be displaced to open the valve and to maintain the valve open until such time as the operation being performed is terminated, whereupon the valve closes to seal air under pressure in tire T.

Figure 3:
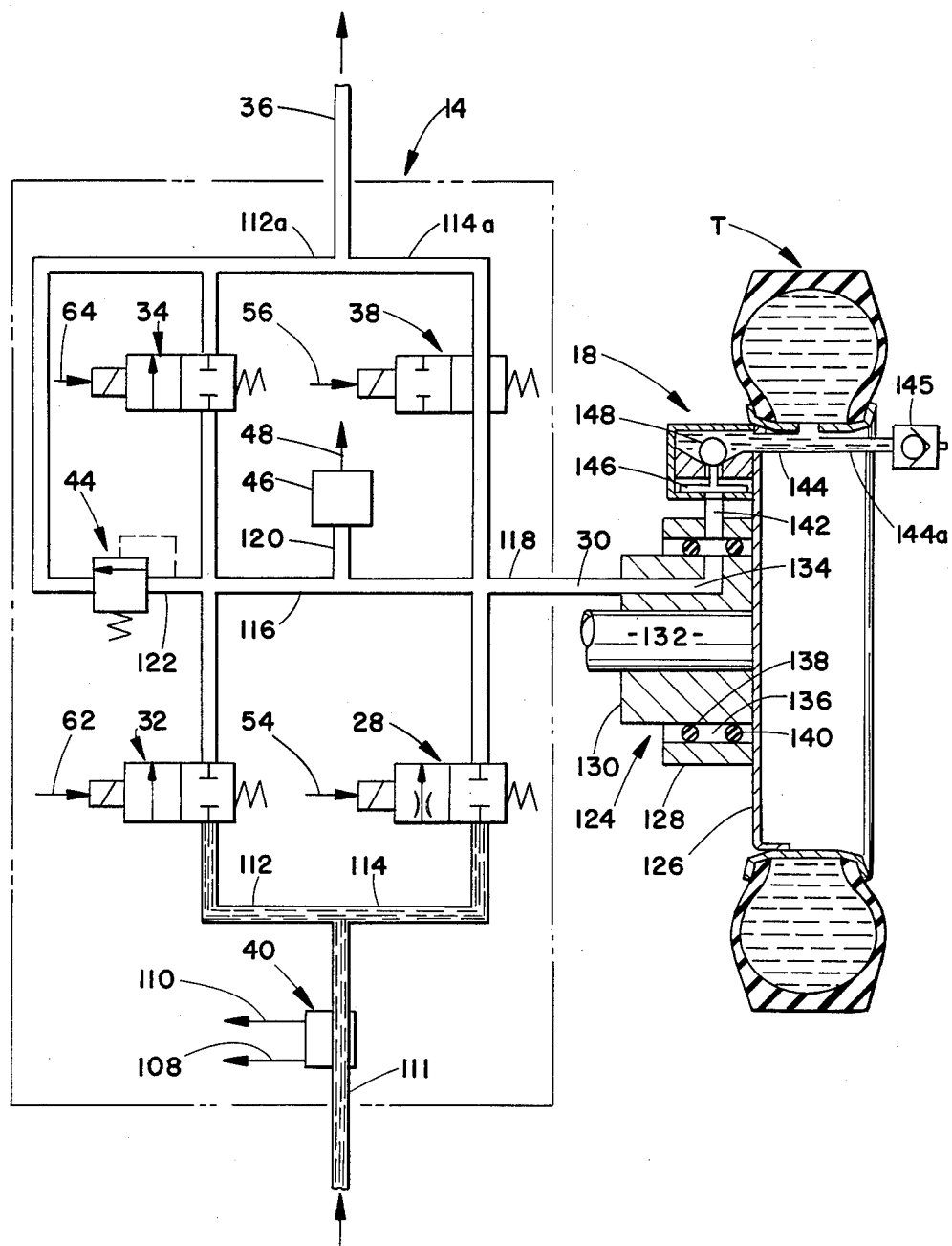
FIG. 3 is a schematic illustration of the pneumatic control module and a vehicle tire showing the positions of the component parts thereof prior to an inflating, deflating or pressure checking operation.
Figure 4:
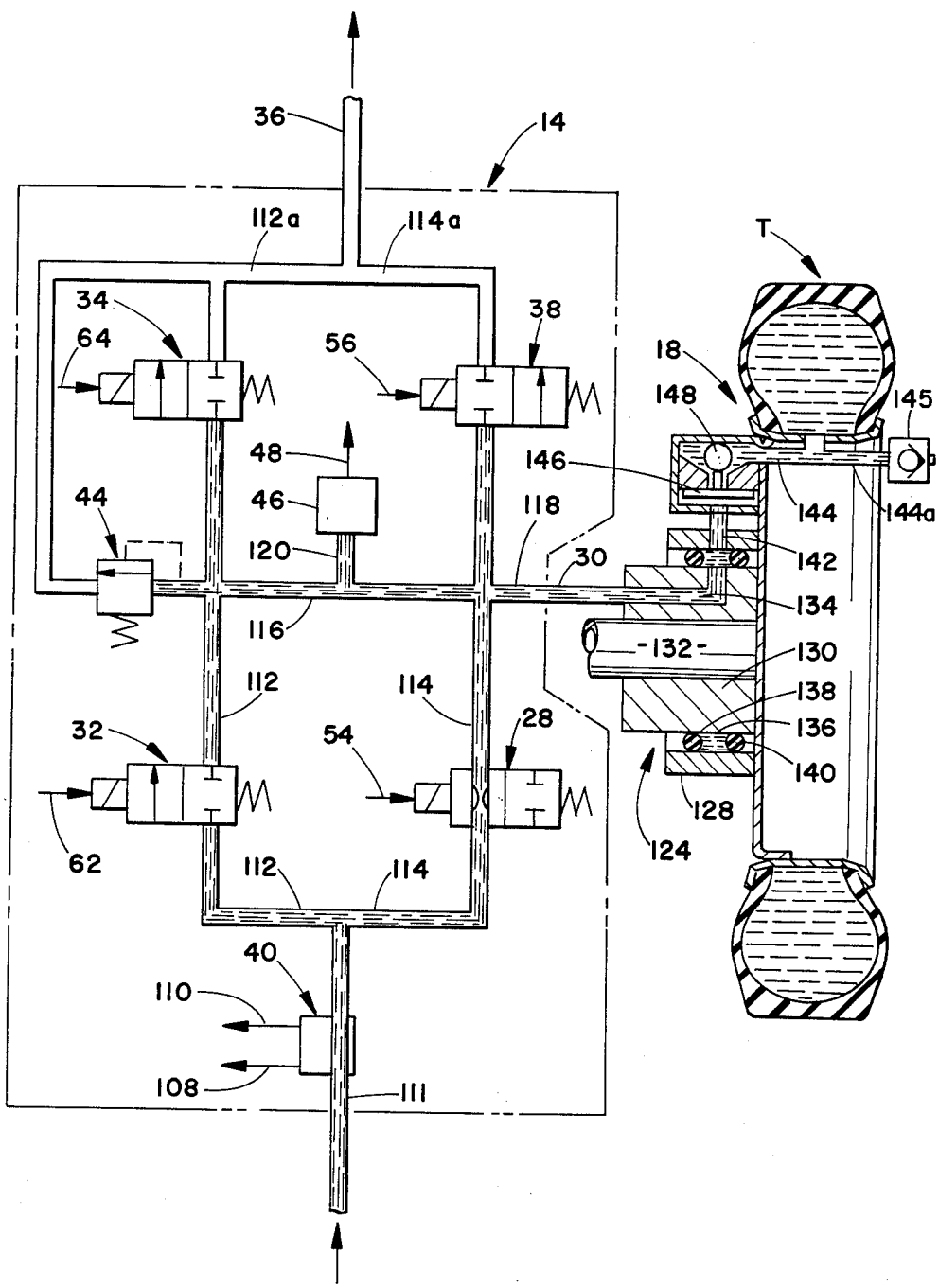
FIG. 4 is a schematic illustration of the pneumatic control module and a vehicle tire illustrating the positions of the component parts thereof during a pressure checking operation and preliminary to an inflating or deflating operation.
Figure 5:
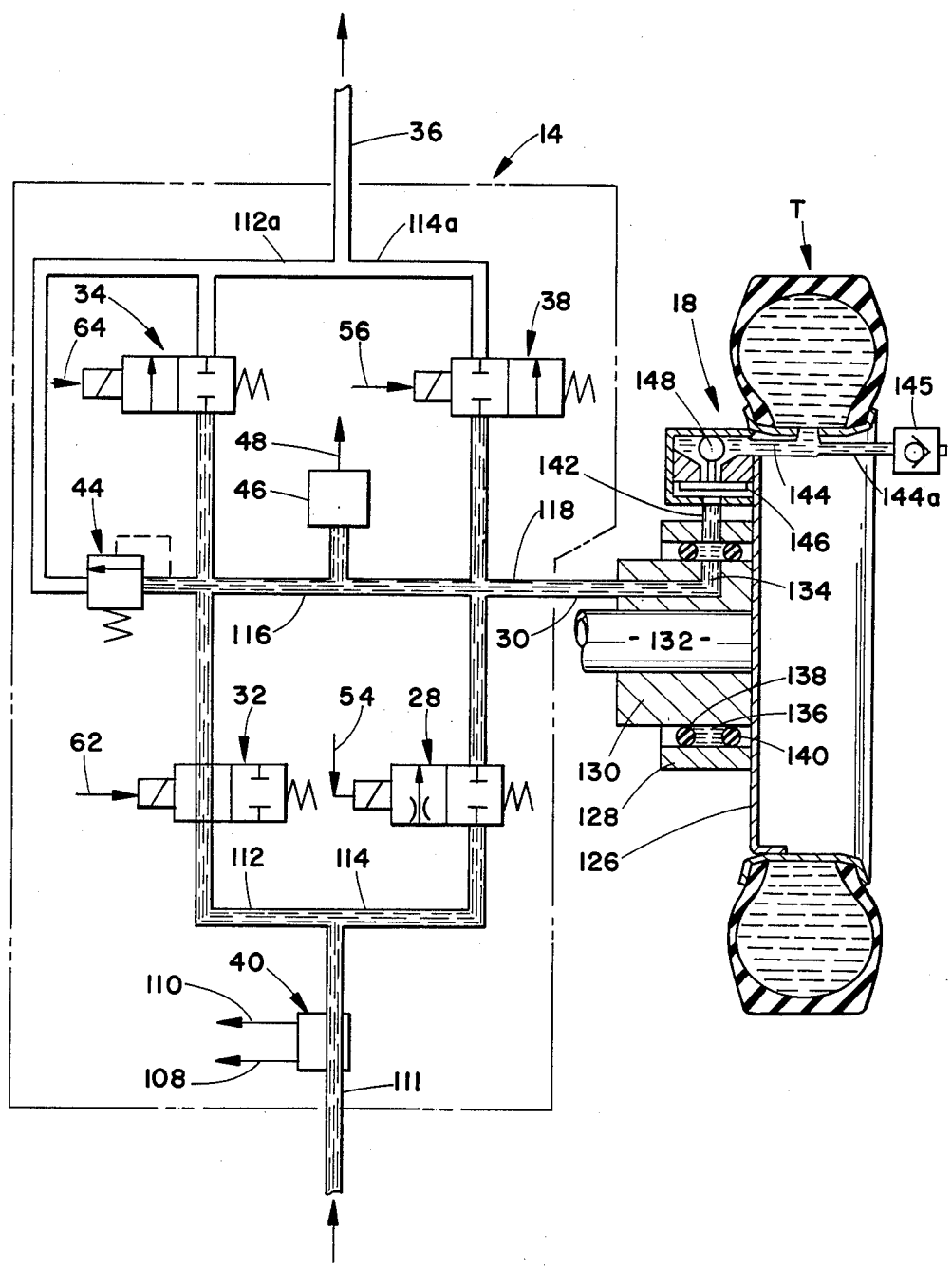
FIG. 5 is a schematic illustration of the pneumatic control module and a vehicle tire showing the positions of the component parts thereof during a tire inflating operation.
Figure 6:
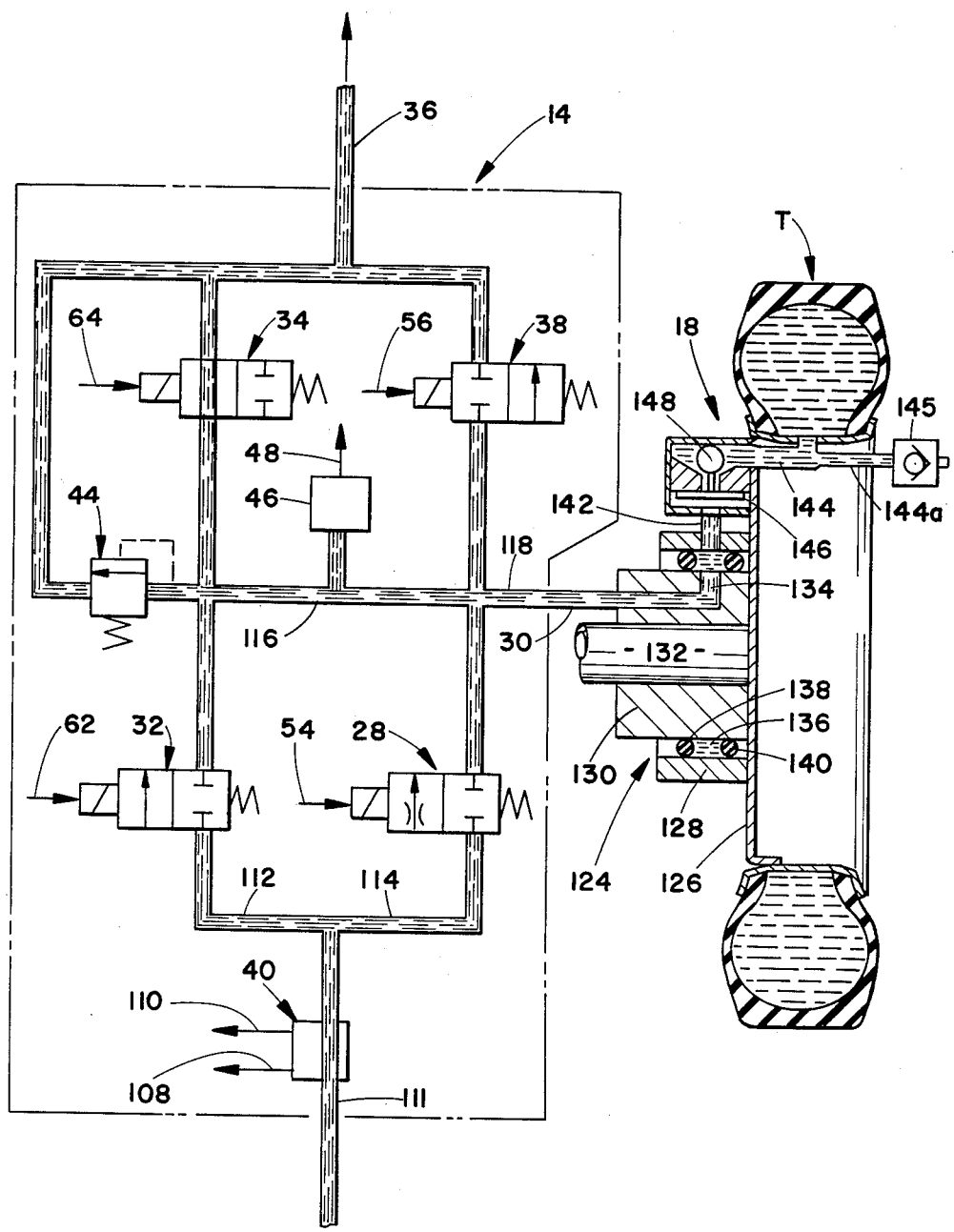
FIG. 6 is a schematic illustration of the pneumatic control module and a vehicle tire showing the positions of the component parts thereof during a tire deflating operation.

It is believed that the operation of the system in connection with achieving pressure checking, tire inflating, tire deflating and other functional capabilities thereof will be understood from the foregoing description in conjunction with the following description with reference in particular to FIGS. 3-6 of the drawing. While the system operations will be described in connection with just one vehicle tire, it will be appreciated that the operations are performed with respect to all of the tires simultaneously. With reference first to FIG. 3, the component parts of the pneumatic control module and tire isolating valve are shown in the positions thereof prior to initiating operation of the system. In this respect, preliminary control valve 28, inflate valve 32 and deflate valve 34 are in their normally closed position, and exhaust valve 38 is in its normally open position, whereby the system is vented to atmosphere downstream of the preliminary control and inflate valves and tire isolating valve 18 is closed to maintain air under pressure in tire T and which pressure defines the existing tire pressure. Assuming the selector component 20 on the operator's control panel is set for a pressure corresponding to the existing tire pressure and that the vehicle engine is not running, starting of the vehicle initiates a pressure check operation. In this respect, when the operator accurate the vehicle ignition switch 106 the output 104 thereof actuates start circuit 100, whereupon the output 102 of the start circuit actuates timing logic circuit 50. Upon actuation of timing logic circuit 50, the outputs 54 and 56 thereof respectively actuate preliminary control valve 28 to the open position thereof and exhaust valve 38 to the closed position thereof. This positions the valves as shown in FIG. 4 whereby it will be appreciated that air under pressure from source 16 flows at a restricted rate into the system through passageway 111 and branch passageway 114, across primary control valve 28 to branches 112, 116 and 120 and thus to pressure transducer 46, through outlet 118 to flow line 30, and through passageways 134 and 142 and against the upstream side 146 of valve 18 to open the latter, whereby the interior of tire T is in communication with the system enabling pressure transducer 46 to sense the existing tire pressure. Timing logic circuit 50 is operable to maintain output 54 for a predetermined period of time, generally from three to five seconds. Such time period is selected to provide sufficient time for the restricted flow of air across valve 28 to fill the flow lines and open valve 18 as described. The time period is manually adjustable on the timing logic circuit component, and the selected time will depend on such factors as the distance between the pneumatic control module and the vehicle's tires, and the number of tires on the vehicle. The time selected will provide for the pressure in the system to reach a magnitude sufficient to open valve 18 and, in connection with the latter function and the differences in the effective areas of valve 18 exposed to such system pressure and to the tire pressure, it will be appreciated that the valve will open under a system pressure less than the existing tire pressure. It will be further appreciated that the time must be sufficient for the system pressure to reach the magnitude required to open valve 18 against the highest possible existing tire pressure which in the embodiment described would be 60 psi, whereby in connection with opening the valve against the lower existing tire pressures of 35 psi, 25 psi and 12 psi by air flow at the same rate for the set time, the system pressure required to open the valve is progressively reduced. However, with respect to the accuracy of the pressure sensed by transducer 46 with respect to the existing tire pressure, the volume of air in the system upstream of valves 18 is so small compared to the volume of air in tires T that, upon opening the isolating valves, there is very little air flow thereacross. This results in an immeasurable change in tire pressure after pressure equalization, namely about 0.25 psi. Therefore, the existing tire pressure sensed by the transducer 46 is basically precise without correction by offset corrections circuit 72 and, accordingly, output 48 under pressure checking conditions is transmitted through circuit 72 without correction to comparator 58.

Further in connection with timing the flow across preliminary control valve 28 and providing restricted flow thereacross, such timed flow provides for the system to fill with air to the pressure necessary to open the isolating valves without undesirable surges in pressure which would not only require time to stabilize the system for the transducer and electronic circuitry associated therewith to function appropriately, but would also adversely affect the system flow lines and component parts, such as by bouncing the isolating valves.

In connection with the automatic pressure check initiated as described above, the electronic controller operates at the end of the timed period for output 54 to stop the latter output whereby preliminary control valve 28 closes. Assuming that the existing tire pressure has not dropped below the pressure for which pressure selector component 20 is set, the controller then operates to stop output 56, whereby exhaust valve 38 opens to quickly exhaust air under pressure to atmosphere through vent 36. This results in a sudden pressure drop across isolating valve 18 whereupon the latter immediately closes and thus maintains the existing pressure in tire T. More particularly with regard to such pressure checking operation and the termination thereof, the output 68 from selector switch setpoint circuit 66 corresponding to the setting of selector component 20 is introduced to setpoint logic circuit 70 and as output 82 therefrom to voltage comparator 58 as earlier described. Upon the opening of tire isolating valve 18 through operation of preliminary control valve 28 as described above, transducer feedback signal 48 representative of the existing tire pressure is introduced as input 76 to voltage comparator 58 for comparison with the selected tire pressure signal. At the end of the timed period for output 54 of timing logic circuit 50, output 80 of the latter switches voltage comparator 58 on, whereupon the inputs 76 and 82 are compared to produce an output signal which, in the tire pressure checking operation being described, is output 78 from the comparator indicative of the pressure of the air in tire T being equal to the selected pressure. Output 78 from voltage comparator 58 to timing logic circuit 50 stops output 56 thereof, whereby exhaust valve 38 opens to quickly exhaust the system to atmosphere and to close tire isolating valve 18 as described, whereupon the component parts are again in the positions shown in FIG. 3.

Assuming in connection with the pressure checking operation described above that the existing tire pressure has dropped below the pressure set by selector component 20, whereby tire inflation is required, comparator input 76 representing the existing tire pressure will be of a lower magnitude than comparator input 82 representing the selected tire pressure. Therefore, following the timed period for timing logic circuit output 54, output 80 from the timing logic circuit will switch the voltage comparator on and the higher magnitude of input 82 thereto will produce a control signal through output 62 to inflate valve 32 to open the latter. Simultaneously, comparator 58 will produce an output signal 75 to offset corrections circuit 72 which will then function to correct transducer signal 48 as set forth hereinafter. At this time, the component parts are in the positions shown in FIG. 5, whereby air under pressure flows unrestrictedly from supply 16 through inlet passageway 11 across inflate valve 32 and tire isolating valve 18 to inflate tire T. The air flow across inflate valve 32 and isolating valve 18 to tire T is high in comparison to the flow across preliminary control valve 28 and valve 18 during the pressure checking operation and, during the tire inflating operation, the air system pressure as sensed by transducer 46 will be higher than the actual pressure in tire T at any point of time during the inflating operation. This error in sensing the tire pressure during an inflating operation is compensated for by the output 74 to offset correction circuit 72 from setpoint input circuit 66, and the correction is initiated by output 75 from the comparator which in effect signals the corrections circuit that inflation is taking place. It will be appreciated, therefore, that the transducer feedback signal 48 is corrected in offset correction circuit 72 for the output 76 thereof to comparator 58 to be accurate with respect to being indicative of the actual tire pressure during inflation. As the tire pressure increases, the output 48 of pressure transducer 46 and thus input 76 to the voltage comparator increases, and when the pressure sensed by the transducer equals the selected pressure the inputs 76 and 82 to voltage comparator 58 are equal. At this time voltage comparator output 62 stops whereupon inflate valve 32 closes, and voltage comparator output 78 is transmitted to timing logic circuit 50 to stop output 56 thereof. As described above, this causes exhaust valve 38 to open and quickly exhaust air under pressure to atmosphere through vent 36 enabling tire isolating valve 18 to substantially instantaneously close to obtain and maintain the desired air pressure in the tire. At this point the component parts are again in the positions shown in FIG. 3.

If the conditions under which the vehicle is operating changes from, for example, "Emergency" to "Cross Country", whereby a higher tire pressure is required, the operator displaces selector component 20 to the "Cross Country" position on the control panel, whereby the output 68 of selector switch setpoint circuit 66 changes to a signal representative of the higher tire pressure and which signal is transmitted to voltage comparator 58 as output 82 of setpoint logic circuit 70. The operator then depresses start button 24 which actuates start circuit 100 for output 102 thereof to actuate timing logic circuit 50. As explained above, actuation of timing logic circuit 50 produces timed output 54 to open preliminary control valve 28 and output 56 to simultaneously close exhaust valve 38, whereby the system fills with air under pressure and opens tire isolating valves 18 as described hereinabove in connection with FIG. 4. At the end of the timed output 54, preliminary control valve 28 closes, and output 48 of transducer 46 is a signal representing the existing tire pressure. This signal is fed back to voltage comparator 58 as output signal 76 from offset correction circuit 72. In connection with a tire inflating operation, signal 76 is of a magnitude less than the input signal from setpoint logic circuit 70 representing the selected pressure whereby, at the end of the timed period for timing logic circuit output 54, output 80 of the timing logic circuit switches on voltage comparator 58 to generate output 62 to open inflate valve 32. The inflating operation then proceeds and terminates as described above, after which the component parts are again in the positions shown in FIG. 3.

Should the conditions under which the vehicle is operating require deflation of the tires to a lower pressure, the operator displaces selector component 20 to the desired setting for such a lower tire pressure and depresses start button 24 to initiate operation of the system a described above in connection with an inflating procedure. In this respect, selector switch setpoint circuit 66 outputs a signal to setpoint logic circuit 70 representative of the newly selected lower tire pressure, whereby a corresponding output 82 is fed to voltage comparator 58. At the same time, timing logic circuit 50 is actuated to generate outputs 54 and 56 to open preliminary control valve 28 and close exhaust valve 38, whereby the component parts are positioned as shown in FIG. 4 to achieve opening of tire isolating valves 18 and thus a feedback signal from transducer 46 to voltage comparator 58 as output 76 from offset correction circuit 72 which is representative of the existing tire pressure. In connection with a deflating operation, input 76 to voltage comparator 58 will be of a magnitude greater than input 82 representing the newly selected pressure, whereby voltage comparator 58 will generate an output signal 64 in response to output 80 from timing logic circuit 50 at the end of timed output 54 thereof. Simultaneously, comparator 58 will provide an output signal 75 to offset corrections circuit 72 which in effect signals the latter that deflation is called for. Output 64 from voltage comparator 58 opens deflate valve 34 whereupon the component parts are in the positions shown in FIG. 6 of the drawing and air under pressure in tire T is exhausted to atmosphere across deflate valve 34 and vent line 36. Since the pressure in tire T is higher than the newly selected pressure, the flow of air from the tire to atmosphere results in pressure transducer 46 sensing a pressure lower than the actual tire pressure. As in connection with the inflating operation, this error in the transducer output 48 is compensated for by the offset corrections circuit 72 by input 74 thereto so that output 76 to comparator 58 accurately reflects the actual tire pressure during deflation. Thus, it will be appreciated that the nature of the correction during a deflating operation is opposite to that during an inflating operation in terms of the polarity of the correction. In other words, correction is added to the transducer output 48 in the deflating operation and is subtracted in connection with the inflating operation. For a given setting of selector component 20, the magnitude of the correction is the same during inflating and deflating operations to reach the tire pressure indicated by the position of the selector component, and the polarity of the correction is determined by the polarity of output 75 from comparator 58 which in turn is determined by the polarity of the difference between compared signals 76 and 82 in comparator 58. Flow across deflate valve 34 in connection with the dimensional relationship between the upstream and downstream ends of tire isolating valves 18 assures that the latter valves remain open against the pressure drop thereacross caused by the higher pressure in tire T. Again, the tire pressure is constantly monitored by pressure transducer 46 whereby the magnitude of output 48 thereof continuously decreases during the deflating operation for input signal 76 to voltage comparator 58 to continuously approach the lower magnitude of input signal 82 indicative of the newly selected tire pressure. When input signals 76 and 82 are equal, indicating that the tire pressure is at the newly selected level, voltage comparator output 64 is stopped to close deflate valve 34, and output 78 from the voltage comparator to timing logic circuit 50 causes cancellation of output 56 thereof whereby exhaust valve 38 opens to quickly exhaust air under pressure from the system to cause instantaneous closure of tire isolating valves 18. At this time the component parts of the system are again in the positions shown in FIG. 3.

In connection with each of the inflating and deflating operations to establish a newly selected tire pressure, setpoint logic circuit 70 receives and stores a signal from output 68 of selector switch setpoint circuit 66 which is representative of a newly selected tire pressure, and at the termination of the inflating or deflating operation by output 78 from voltage comparator 58 to timing logic circuit 50, the latter has an output 150 to setpoint logic circuit 70 which operates to energize the setpoint light 22 corresponding to the newly selected pressure. Energizing of the light provides the operator with a visual indication of completion of the inflating or deflating operation, and the light remains energized to provide the operator with a visual indication of the existing tire pressure. When a subsequent pressure checking, inflating or deflating operation is initiated, the light is extinguished until such time as the operation is completed, whereupon the same or a different light is energized depending on the operation performed.

As mentioned hereinabove, the air supply source for tire inflating and deflating systems is often an onboard source of air under pressure provided for the vehicle's brake system. In such a case, the brake system is given priority whereby, should the source pressure drop below a predetermined level for the brake system, such as 75 psi in connection with the disclosed embodiment, a priority device precludes operation of or further operation of the tire inflating and deflating system until the pressure is again above the predetermined minimum. While such a priority device could be a pressure responsive shutoff valve positioned in air supply line 15 and which would close in response to a pressure drop below the predetermined minimum, it is preferred to use a pressure switch 40 as shown in the preferred embodiment. In this respect, to merely close the air inlet supply line during operation of the system other than in the deflating mode and after deflation has begun, would in effect freeze the system until such time as the pressure responsive valve opened. Such freezing of the system would result in air under pressure being maintained in the system and across wheel seals 138 and 140, whereby the latter would be subjected to undesirable stress, and to excessive wear if the vehicle were moving, for whatever period would be required before the pressure responsive valve opened to enable continuance of the procedure. Pressure switch 40 advantageously avoids such a situation. In this respect, in response to a drop in the air supply pressure below the predetermined minimum pressure switch 40 has an output 110 to timing logic circuit 50 which cancels output 80 thereof to voltage comparator 58 and thus outputs 62 and 64 of the latter to assure de-energization and closure of the inflate and deflate valves. At the same time, output 110 cancels outputs 54 and 56 of the timing logic circuit to close preliminary control valve 28 and open exhaust valve 38 to exhaust system pressure and cause closure of tire isolating valves 18. When the system pressure increases to the predetermined minimum, pressure switch 40 has an output 108 to start circuit 100 which functions to reinitiate the operation which was interrupted. Accordingly, for whatever period is required between interruption and reinitiation of the operation, the system is depressurized, and this increases the life of the axle seals 138 and 140. Similarly, should the supply air pressure decrease below the predetermined minimum other than when the system is in operation, a return of the pressure to the predetermined minimum generates output 108 to start circuit 100 to initiate a pressure checking operation as described hereinabove. It will be appreciated that output 108 is only generated in response to a pressure drop below the predetermined minimum and a subsequent return of the pressure to the preselected level.

As mentioned hereinabove, the electronic control module includes a voltage comparator 88 continuously receiving an input signal 86 from setpoint logic circuit 70 representative of the maximum speed of the vehicle with the tires inflated to the pressure at which the selector switch setpoint input circuit 66 is set. Voltage comparator 88 also receives an input signal 90 from a vehicle speedometer voltage pickup adaptor 92 indicative of the speed at which the vehicle is being operated. In the event that the vehicle is operated at a speed higher than that represented by input 86, voltage comparator 88 generates an output signal to a timer 94 actuating the latter to begin timing the duration of the signal from voltage comparator 88. If the signal continues uninterrupted for a predetermined period of time, such as one minute, timer 94 generates a signal 96 to setpoint logic circuit 70 which turns on overspeed indicator light 26 and provides voltage comparator 58 with an input signal 82 representative of the next highest tire pressure above the existing tire pressure. Simultaneously, timer 94 generates an output signal 98 to start circuit 100 which in turn generates an output signal 102 to timing logic circuit 50 to initiate a tire inflating operation which then proceeds as described hereinabove. In the event the overspeed signal from comparator 88 to timer 94 is interrupted during the timed period, the timer resets, whereby it will be appreciated that it is the continuation of the overspeed signal for a predetermined period of time which initiates adjustment of the tire pressure. The system only functions automatically to adjust air pressure upwards. Deflation to a lower pressure requires operator action by selecting a lower pressure and initiating system operation.

In connection with the disclosed embodiment of a six wheel vehicle, a source of air at 100 psi, and selectable tire pressures of 12 psi, 25 psi, 35 psi and 60 psi, the inflating and deflating valves are each ½" valves, the exhaust valve is a ¾" valve, and the preliminary control valve is a ⅜" valve, such dimensions representing the size of the flow passageway therethrough. With these valve relationships, deflating from any one of the tire pressures to the next lower pressure is achieved in less than two minutes time, inflating from 12 psi to 25 psi take less than two minutes, inflating from 25 psi to 35 psi takes less than four minutes, and inflating from 35 psi to 60 psi takes less than six minutes. Further, it will be appreciated from the valve sizes identified that the flow rate across the inflating valve at the supply pressure of 100 psi is greater than the flow rate across the deflate valve in that the maximum tire pressure is 60 psi. Further, it will be appreciated that the size of the exhaust valve provides for a higher flow rate thereacross than that across the deflate valve at any given one of the available tire pressures, and that the size of the preliminary control valve provides for the flow rate thereacross at the supply pressure of 100 psi to be less than the flow rate across the inflate valve.

A preferred structural embodiment of tire isolating valve 18 for use in the system described herein is illustrated in FIGS. 7 and 8 of the drawing. With reference to these Figures, the valve includes a cylindrical body portion 156 having an axis A, and end cap members 158 and 160 respectively providing the upstream and downstream ends of the valve with respect to the direction of flow therethrough from the air source to tire T. Body portion 156 and end caps 158 and 160 are provided with aligned ears 162 which facilitate interconnection of the end caps and body portion through nut and bolt assemblies 164. Further, end caps 158 and 160 are provided with integral mounting flanges 166 which facilitate mounting of the valve on the vehicle wheel assembly. It will be appreciated, of course, that other mounting arrangements can be employed. End cap 158 has an inlet passageway 168 adapted to be connected to an air flow passageway corresponding to air passageway 142 described hereinabove, and end cap 160 has an outlet passageway 170 for connection to a flow line corresponding to flow line 144 described hereinabove and leading to the interior of tire T. End cap 160 also has a passageway 172 adapted to be connected to a flow line corresponding to branch 144a connected to check valve 145. In connection with the latter, it will be appreciated that valve 145 can be directly mounted in passageway 172.

Body portion 156 houses a diaphragm actuator assembly comprised of a flexible diaphragm 174 clamped between body portion 156 and end cap 158, and a tubular push rod 176 clamped to diaphragm 174 by means of a skirt 178, washer 180 and an apertured screw 182 extending through the washer, diaphragm and skirt and into threaded engagement with the interior of push rod 176. Body portion 156 further houses a poppet valve assembly comprising a poppet valve member 184, a retaining sleeve 186 supported in body portion 156 by threaded interengagement therewith and providing a seating edge 188 at the axially inner end thereof, a retaining ring 190 supported in the body portion against a shoulder therein, not designated numerically, and a resilient annular sealing ring 192 between retaining ring 190 and the corresponding end of sleeve 186 and radially outwardly adjacent seating edge 188. The axially inner end of valve member 184 includes a generally flat end face 194 and first and second conical surfaces 196 and 198, respectively. Surface 196 is biased toward seating and sealing engagement with edge 188 and seal ring 192 by a spring 200, and surfaces 196 and 198 are axially spaced by a cylindrical wall portion 202, whereby surface 198 is spaced from retaining ring 190 to provide a throttling space 204 therebetween. The axially inner portion of tubular push rod 176 is slidably supported by sleeve 186, and the innermost end of the push rod engages end face 194 of poppet member 184 and is provided with a plurality of passageways 206 extending radially therethrough. Surface 198 of poppet valve member 184 is provided with a plurality of flow passageways 208 extending axially and radially therethrough and communicating throttling space 204 with the downstream side of the valve member immediately downstream of seal ring 192 and which downstream side of the valve member is defined by a cylindrical wall 210 by which the valve member is slidably supported in body portion 156. The upstream end of diaphragm mounting screw 182 is adjacent end cap member 158 and provides an opening 212 communicating passageway 168 with a cavity 214 on the upstream side of diaphragm 174, and the downstream side of the diaphragm is vented to atmosphere across a resilient check valve 216 in body portion 156. Check valve 216 prevents moisture, dirt or other external contaminates from entering the downstream diaphragm cavity.

The apertured diaphragm mounting screw 182 provides a restricted passageway 218 between inlet passageway 168 and the interior of push rod 176. The ratio of the effective area of diaphragm 174 to the area of poppet valve member 184 at the point of engagement of the latter with seal ring 192, and the area of passageway 218 relative to the area of the opening between poppet valve member 184 and seal ring 192 when valve member 184 is fully opened, are important design parameters in connection with opening the isolating valve, maintaining the valve open during inflation and deflation and, especially, in obtaining substantially instantaneous closure of the isolating valve when the system exhaust valve opens at the termination of a pressure checking, inflating or deflating operation. In this respect, optimum operating characteristics are achieved with a diaphragm to poppet valve area ratio in the range of from about 1.25:1 to about 2.5:1, and with an area of passageway 218 that is about 15% to about 25% of the area of the opening between poppet valve member 184 and seal ring 192 when the poppet valve member is fully opened. The function of spring 200 is primarily to provide a positive closing force and to overcome any tendency of the poppet valve member to stick in the open position thereof, and the spring is not relied upon as the primary closing force for the valve.

Assuming the vehicle tires to be at a given pressure, it will be appreciated from the description of the system hereinabove that initiation of a pressure check, inflating or deflating operation first provides for restricted flow of air under pressure from the source across preliminary control valve 28 for a predetermined period of time sufficient for the system passageways to fill with air under pressure of a magnitude sufficient to open tire isolating valve 18. In this respect, such air under pressure flows into air inlet 168 of the valve and across opening 212 into cavity 214 and, simultaneously through passageway 218 to the interior of push rod 176 and against end face 194 of poppet valve member 184. At the point where the pressure on the upstream side of diaphragm 174 in connection with the effective area thereof provides a force greater than that of the tire air pressure against the effective area of poppet member 184, the diaphragm is displaced in the downstream direction for push rod 176 to displace poppet member 184 from engagement with seat edge 188 and seal ring 192 to provide for communication across the valve between the pneumatic control module and vehicle tire. As described hereinabove, preliminary control valve 28 then closes, and transducer 46 generates a feedback signal representative of the existing tire pressure. If the system calls for inflating of the tire, inflate valve 32 opens and air under pressure from source 16 flows through inlet 168, passageway 218, ports 206, ports 208 and outlet passageway 170 to the tire. When the tire pressure reaches the desired level as sensed by the transducer, inflate valve 32 closes and exhaust valve 38 opens to quickly exhaust air from the system to atmosphere. Such quick exhausting of air from the system provides a sudden pressure drop at the upstream end of valve 18 by evacuation of air in cavity 214 through inlet passageway 168. This sudden decay in pressure in cavity 214 creates a sudden flow of air under pressure through restricted passageway 218 toward passageway 168 from the downstream side of the poppet valve thus creating a pressure drop across the poppet valve by which the latter moves toward seal 192 under the influence of the air under pressure in the tire. As the poppet valve member moves toward the seal, the closing action thereof throttles the opening across the seal thus creating more closing force and accelerating the closing action, whereby the latter is substantially instantaneous upon opening of system exhaust valve 38.

If the system demands a tire deflation following the opening of isolating valve 18, deflate valve 34 opens to achieve such deflation, and air flows from tire T across valve 18 and through deflate valve 34 to atmosphere. The flow across deflate valve 34 in effect creates a back pressure against diaphragm 174 such that the pressure drop across restricted passageway 218 in the direction of flow from the tire is not sufficient to produce an imbalance tending to close the poppet valve. Accordingly, the isolating valve remains open and the air continues to flow from the tire to atmosphere across the deflate valve until the tire pressure reaches the desired level, at which time the deflate valve closes and exhaust valve 38 opens to achieve instantaneous closure of isolating valve 18 as described above.

Figure 9:
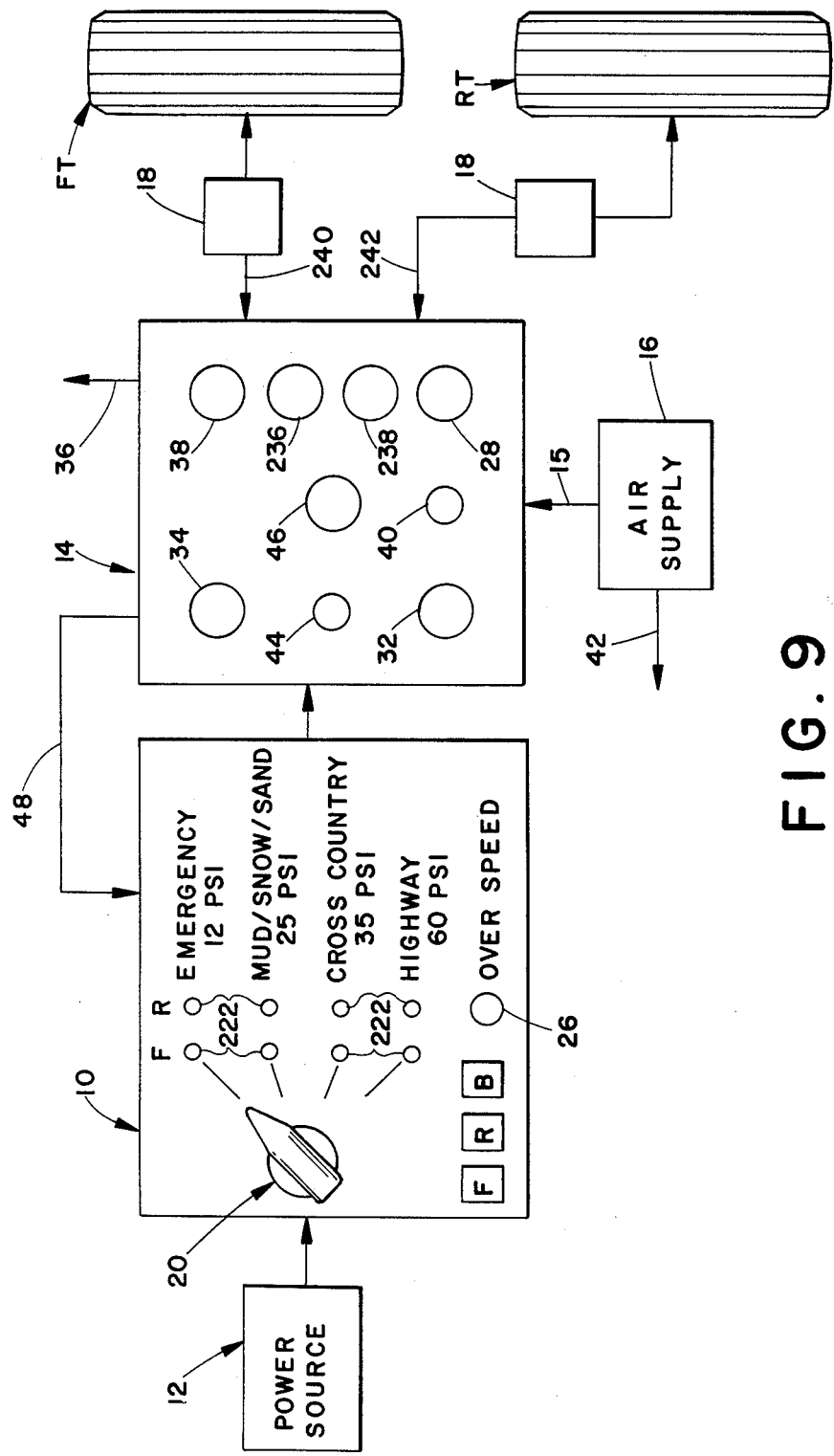
FIG. 9 is a schematic representation similar to FIG. 1 and showing a modification of the apparatus for selective operation with the front, rear or both front and rear tires of a vehicle.
Figure 10:
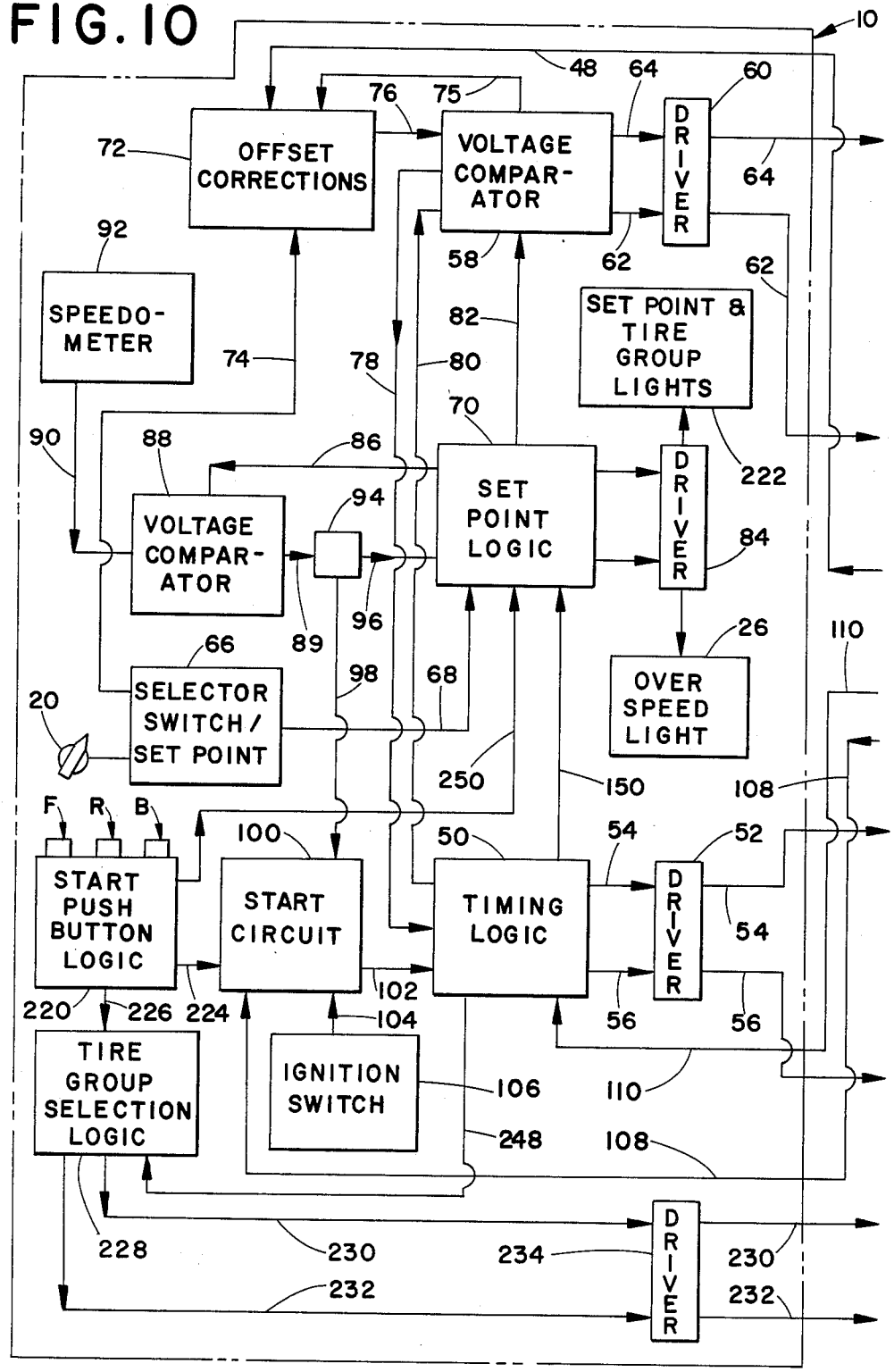
FIGS. 10 and 10A are together a schematic representation similar to FIGS. 2 and 2A and showing the modification represented in FIG. 9: and, FIG. 11 is a schematic illustration of the pneumatic control module and the front and rear tires of a vehicle showing positions of the component parts of the modification represented in FIG. 9 prior to an inflating, deflating or pressure checking operation.
Figure 11:
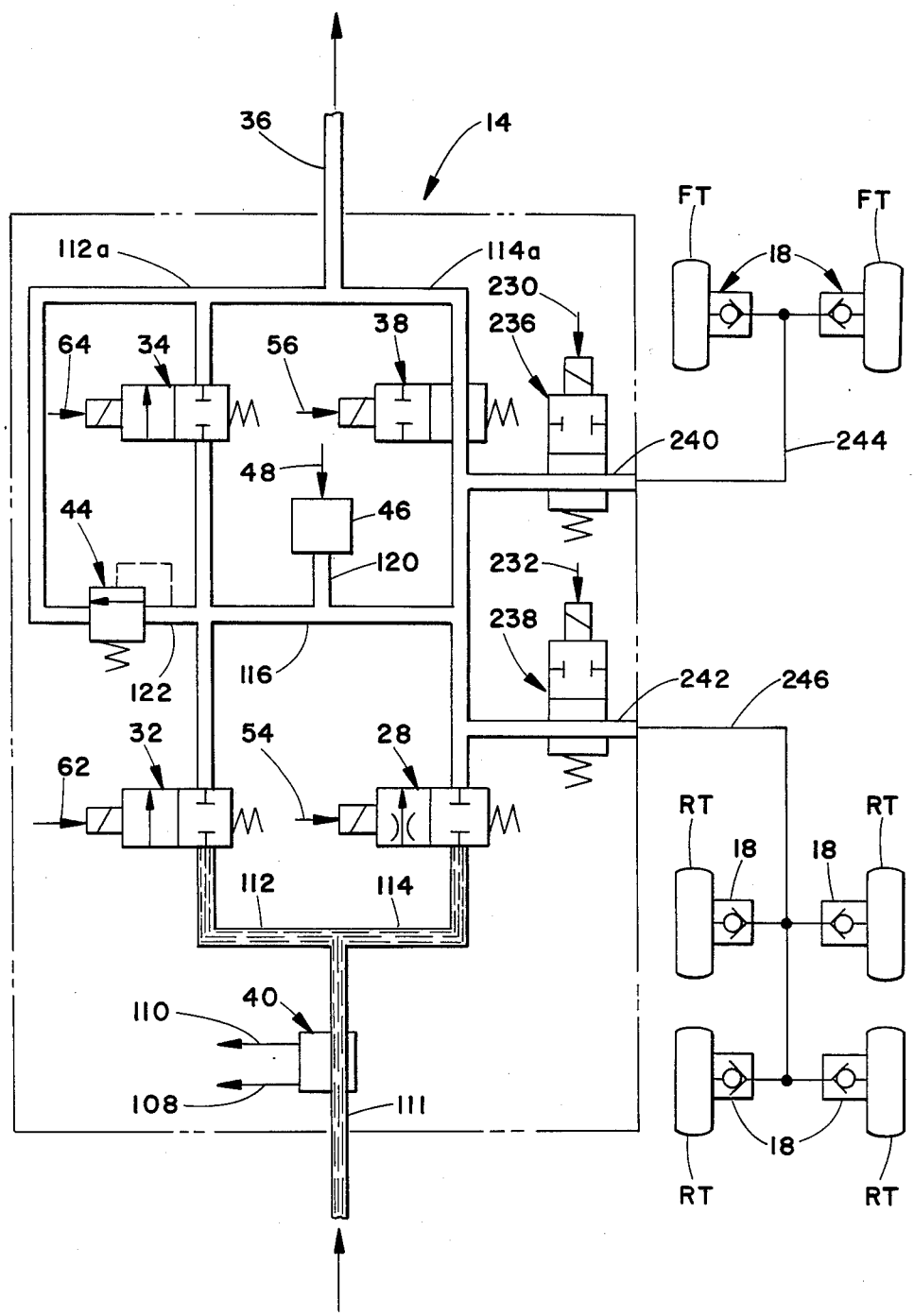

Referring now to FIGS. 9-11 of the drawing, there is schematically illustrated a modification of the system and apparatus illustrated in FIGS. 1-8 and which advantageously enables the selective inflating, deflating or pressure checking of either the front tires of a vehicle, the rear ties of the vehicle, or both the front and rear tires simultaneously. In FIGS. 9-11, component parts corresponding to those described hereinabove in connection with FIGS. 1-8 are represented by like numerals.

Figure 10A:
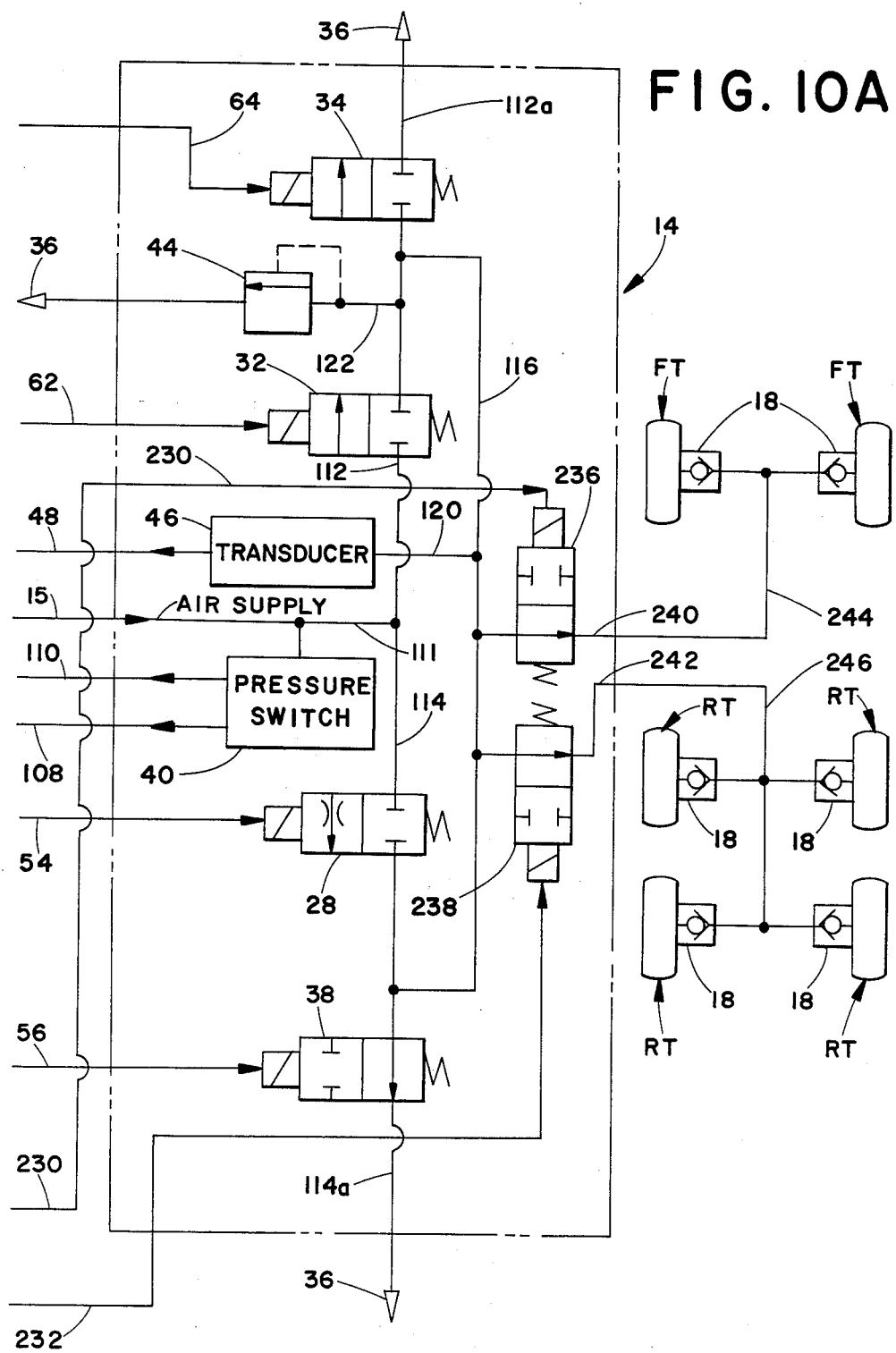

The modifications by which the foregoing selectivity is achieved with respect to inflating, deflating or pressure checking the front, rear or both front and rear tires of a vehicle include the replacement of start pushbutton switch 24 with a start pushbutton logic circuit 220 having "Front", "Rear" and "Both" pushbuttons F, R and B, respectively, accessible to the vehicle operator on the front panel of control module 10, and the replacement of setpoint indicator lights 22 with two lights 222 for each setpoint and under column headings F and R representing the front and rear tire groups, respectively. Start pushbutton logic circuit 220 is a dual four input OR gate available from RCA Corp. and provides an output 224 to start circuit 100 and, in response to depression of start buttons F and R, an output 226 to a tire group selection logic circuit 228 comprised of a dual flip-flop CD4013 and a quad two input AND gate CD4081 available from RCA Corp. Tire group selection logic circuit 228 is operable as described hereinafter to provide outputs 230 and 232 which operate through a driver 234 to respectively control front and rear tire group control valves 236 and 238 provided in pneumatic control module 14. Each of the latter valves is a normally open solenoid operated valve. Further in connection with the system parameters described herein in connection with FIGS. 1-8, each of the valves 236 and 238 has a ½" flow passageway therethrough. The pneumatic control module is modified to accommodate valves 236 and 238 by providing flow passageway 116 with a front tire outlet passageway 240 in which valve 236 is disposed and a rear tire outlet passageway 242 in which valve 238 is located. As will be appreciated from FIGS. 10A and 11, the front tires FT of the vehicle are connected with outlet passageway 240 by means of a common flow line 244 and rear tires RT of the vehicle are connected to outlet passageway 242 by means of a common flow line 246. Each of the vehicle tires as in the earlier description is provided with a pneumatically actuated tire isolating valve 18. For the purpose set forth hereinafter, timing logic circuit 50 provides an output 248 to tire group selection logic 228, and start pushbutton logic circuit 220 provides an output 250 to setpoint logic circuit 70.

FIG. 11 corresponds in general with FIG. 3 and, in this respect, shows the several valves in their normal positions prior to and following system operation. In connection with the embodiment shown in FIGS. 9-11, the system operates basically as described herein in connection with FIGS. 3-6 to achieve tire inflating, deflating and pressure checking operations. To begin with in this respect, and presuming selector component 20 to be appropriately positioned for the selected operation, if the operator depresses pushbutton B, electing an operation of the system with respect to both the front and rear tires of the vehicle, start pushbutton logic circuit 220 generates output 224 to start circuit 100 to initiate system operation in the manner described herein in connection with the depression of pushbutton 24. Output 226 of start pushbutton logic circuit 220 is not generated in response to depression of pushbutton B. Accordingly, front and rear tire group control valves 236 and 238 remain in their normally open position as shown in FIG. 11 and the system operates as described in connection with FIGS. 3–6 hereinabove to open tire isolating valves 18 and to then perform the pressure checking, tire inflating or tire deflating operation called for by the position of selector component 20. In connection with such operation, it will be appreciated from FIG. 11 that air will flow across both tire group control valves 236 and 238 and thus to the front and rear tire groups through lines 244 and 246, respectively.

Should the vehicle operator elect to perform a pressure checking, inflating or deflating operation with respect only to the front tires of the vehicle, for example, selector component 20 is appropriately positioned for the selected operation and start pushbutton F is depressed. Depression of pushbutton F provides output 224 from start pushbutton logic circuit 220 to start circuit 100 to initiate system operation and, simultaneously provides output 226 to tire group selection logic 228. In connection with depression of pushbutton F, output 226 prepares tire group selection logic 228 to generate output 232 thereof to achieve closure of rear tire group control valve 238 for the reason which will become apparent hereinafter. As described herein in connection with FIGS. 3–6, actuation of start circuit 100 generates output 102 to timing logic circuit 50 which in turn provides outputs 54 and 56 to respectively open preliminary flow control valve 28 and close exhaust valve 38. In connection with the present embodiment, timing logic circuit 50 simultaneously provides output 248 to tire group selection logic 228 to switch on output 232 thereof to actuate normally open rear tire group control valve 238 to its closed position, thus closing off outlet passageway 242 and line 246 to the flow of air to rear tires RT. Front tire group control valve 236 remains open, and the selected pressure checking, tire inflation or deflation operation is then achieved with respect to front tires FT as described herein in connection with FIGS. 3–6. Valve 238 remains closed throughout the operation, and when timing logic circuit output 56 is turned off to achieve opening of exhaust valve 38 at the conclusion of the operation, output 248 from the timing logic circuit to tire group selection logic 228 is also turned off. This turns off output 232 of the tire group selection logic 228, whereupon rear tire group control valve 238 returns to its normally open position shown in FIG. 11.

Should the vehicle operator elect to perform a pressure checking, inflating or deflating operation with respect only to the rear tires, selector component 20 is appropriately positioned and the operator depresses rear tire group start button R, whereupon start pushbutton logic 220 provides output 224 to start circuit 100 to initiate system operation and simultaneously provides output 226 to tire group selection logic 228. In connection with depression of pushbutton R, output 226 prepares tire group selection logic 228 to generate output 230 to close front tire group control valve 236. As described above in connection with front tire selection, start circuit 100 generates output 102 to timing logic 50 whereupon outputs 54, 56 and 248 are simultaneously produced. Outputs 54 and 56 respectively operate to open preliminary control valve 28 and close exhaust valve 38, and output 248 triggers tire group selection logic 228 for the latter to generate output 230 to close front tire group control valve 236, whereby outlet passageway 240 and line 244 are closed to the flow of air to front tires FT. Rear tire group control valve 238 remains open, and front tire group control valve 236 remains closed throughout the selected pressure checking, inflating or deflating operation with respect to the rear tire group. When the selected operation is completed and timing logic output 56 is turned off to achieve opening of exhaust valve 38, timing logic output 248 to tire group selection logic 228 is simultaneously turned off, whereby output 230 from the latter is turned off and front tire group control valve 236 returns to its normally open position shown in FIG. 11.

In connection with the setpoint and tire group indicator lights 22, one of the lights in each column F and R is energized at the completion of a pressure checking, inflating or deflating operation to provide the vehicle operator with a visual indication that the operation is completed and a visual indication representing the tire pressure then existing in each of the front and rear tire groups. More particularly in this respect, when pushbuttons F, R and B are depressed, output 250 from start pushbutton logic circuit 220 to setpoint logic circuit 70 provides the latter with a signal corresponding to the selected tire group and this signal is stored in setpoint logic circuit 70. As described herein in connection with FIGS. 1–8, setpoint logic circuit 70 also receives and stores a signal from output 68 of selector switch setpoint circuit 66 and which output 68 is representative of the tire pressure for which selector component 20 is set. At the end of the inflating, deflating or pressure checking operation, output 150 from timing logic circuit 50 to setpoint logic circuit 70 operates to output a signal through driver 84 to energize the pair of lights indicating the pressure in each tire group. Signals representing the pressure existing in each tire group is stored in setpoint logic circuit 70, whereby during subsequent operation of the system to change the pressure in one tire group, the indicator light for the other tire group remains lit. Following such operation the light corresponding to the new pressure in the one tire group is energized to indicate completion of the operation as well as the new pressure.

While considerable emphasis has been placed on the preferred embodiments disclosed herein, it will be appreciated that other embodiments of the invention can be made and that many changes can be made in the preferred embodiments without departing from the principals of the present invention. In this respect, for example, it will be appreciated that the tire isolating valve could be electrically actuated to open following filling of the system with air to the pressure existing in the tires, or could be a pilot operated valve as opposed to the preferred signal line type. Moreover, it will be appreciated that other valve structures of the single line type can be devised to achieve the desired operating characteristics, and that modifications of the embodiment disclosed can be made without objectionally affecting the operating characteristics. In this respect, for example, it will be appreciated that a piston type actuator could be used in place of the diaphragm actuator, and that in either case the tubular stem or its equivalent could be directly connected to the poppet valve member. Separate stem and valve components are preferred to avoid potential alignment problems and sticking of the displaceable components during valve operation. Further, while the system is disclosed as having four selectable tire pressures and the vehicle is disclosed as having six tires, it will be appreciated that the system is operable as described in connection with a vehicle having more or less than six tires, with any number of selectable pressures, and with pressure levels other than those specifically referred to herein.

With further regard to the system, it will be appreciated that inflating and deflating times can be adjusted such as, for example, by adjusting the supply air pressure and/or using different size valves and that, in connection with initially opening tire isolating valves of the pneumatically actuated variety, that such could be achieved through the opening of an unrestricted flow valve, such as the inflating valve in the disclosed system.

The foregoing modifications, as well as other embodiments of the invention, will be suggested or obvious to those skilled in the art from the disclosure herein of the preferred embodiments whereby it is to be distinctly understood that the foregoing descriptive matter is to be interpreted merely as illustrative of the present invention and not as a limitation.

Having thus described the invention it is claimed:

1. A system for controlling the inflation pressure of at least one pneumatic tire of a vehicle comprising, a source of air under pressure, flow line means between said source and said tire, pneumatically actuated tire isolating valve means in said flow line means normally biased closed by air in said tire to maintain air under pressure in said tire, inflating and deflating control means including means to open said isolating valve means, means to continuously produce a first signal having a given magnitude representing a desired tire pressure, means to continuously produce a second signal having a variable magnitude and representing the pressure of air in said tire, and means receiving and continuously comparing said first and second signals and continuously providing control signal output means representing the difference between the magnitudes of said first and second signals, a normally closed tire inflating valve in said flow line means between said source and said isolating valve means, said inflating valve being opened by said control signal output means when said first signal first greater than said second signal to provide for air flow from said source to said tire, a normally closed tire deflating valve in said flow line means between said source and said isolating valve means, said deflating valve being opened by said control signal output means when said first signal is less than said second signal to provide for air flow from said tire to atmosphere across said deflating valve, an exhaust valve in said flow line means between said isolating valve means and said source, said exhaust valve being closed during inflating and deflating of said tire and being opened by said control signal output means when said first and second signals are equal to provide for exhausting all of the air in said flow line means between said isolating valve means and said source to atmosphere across said exhaust valve, and said means for opening said isolating valve means including a normally closed flow restricting control valve in said flow line means and means to open said control valve for a predetermined period of time while said inflating valve and said deflating valve are in said normally closed dispositions thereof, said control valve when open providing restricted flow of air from said source to said isolating valve means for said predetermined period of time to control the opening of said isolating valve means.

2. A system according to claim 1, wherein said means to produce said second signal includes pressure transducer means.

3. A system according to claim 1, wherein said inflating and deflating control means comprises electric circuit means and said means receiving and comparing said first and second signals includes electric signal comparing means in said electric circuit means, said means to produce said first signal including adjustable means in said electric circuit means providing an electric signal corresponding to a selected one of a plurality of selectable tire pressure, said means to produce said second signal including pressure transducer means providing an electric signal corresponding to tire air pressure, and said control signal output means including electric output signal means from said comparing means.

4. A system according to claim 3, wherein said inflating, deflating and exhaust valves are electrically actuated in response to said electric output signal means.

5. A system according to claim 4, wherein said control valve is electrically actuated and said means to open said control valve includes switch means in said electric circuit means.

6. A system according to claim 5, and pressure responsive switch means operable to de-energize said inflating, deflating, exhaust and control valves in response to a drop in pressure from said source of air below a predetermined level.

7. A system according to claim 1, wherein said isolating valve means has upstream and downstream ends with respect to a direction of air flow from said source to said tire, each said ends having a surface area against which air under pressure is imposed, and the ratio of the area of said upstream end to said downstream end is from about 1.25:1 to about 2.5:1.

8. A system according to claim 7, wherein said inflating and deflating control means comprises electric circuit means and said means receiving and comparing said first and second signals includes electric signal comparing means in said electric circuit means, said means to produce said first signal including adjustable means in said electric circuit means providing an electric signal corresponding to a selected one of a plurality of selectable tire pressures, said means to produce said second signal including pressure transducer means providing an electric signal corresponding to tire air pressure, said control signal output means including electric output signal means from said comparing means.

9. A system according to claim 1, wherein said inflating valve opens to provide air flow from said source to said tire at a first flow rate, said deflating valve opens to provide flow of air thereacross from said tire to atmosphere at a second flow rate, and said exhaust valve opens to provide air flow thereacross from said flow line means to atmosphere at a third flow rate higher than said second flow rate.

10. A system according to claim 9, wherein said control valve provides said flow of air at a fourth flow rate lower than said first flow rate.

11. A system according to claim 1, wherein said isolating valve means comprises a body portion having an axis and upstream said downstream ends with respect to the direction of air flow from said source to said tire, means providing a valve seat in said body portion intermediate said ends thereof, an axially displaceable poppet valve member in said body portion engaging said seat in the direction from said downstream toward said upstream end and having an upstream end, axially displaceable pressure responsive actuator means in said body portion adjacent said upstream end thereof and having a downstream end at said upstream end of said poppet valve member, said actuator means having an upstream end and an opening axially communicating said upstream end of said actuator means with said upstream end of said poppet valve member, said actuator means being displaceable by air under pressure from said source to displace said poppet valve member from said seat to pace said upstream and downstream ends of said body portion in flow communication across said seat and through said opening in said actuator means.

12. A system according to claim 11, and spring means biasing said poppet valve member toward said seat.

13. A system according to claim 11, wherein said actuator means includes a flexible diaphragm.

14. A system according to claim 11, wherein said upstream end of said actuator means has a surface area acted upon by air under pressure from said source and said poppet valve member has a surface area acted upon by air under pressure in said tire, said surface area of said actuator means being greater than said surface area of said poppet valve member.

15. A system according to claim 14, wherein said areas of said actuator means and poppet valve member are in a ratio of from about 1.25:1 to about 2.5:1.

16. A system according to claim 14, wherein said poppet valve member has an open position spaced from said seat and providing an annular passageway at said seat having a given area, and said opening through said actuator means has an area less than said given area.

17. A system according to claim 16, wherein said area of said opening is from about 15% to about 25% of said given area.

18. A system according to claim 17, wherein said areas of said actuator means and poppet valve member are in a ratio of from about 1.25:1 to about 2.5:1.

19. A system according to claim 18, wherein said actuator means includes a flexible diaphragm.

20. A system according to claim 19, and spring means biasing said poppet valve member toward said seat.

21. In a system for inflating and deflating a pneumatic tire of a vehicle and which system comprises a source of air under pressure, flow line means between said source and said tire, normally closed tire isolating valve means in said flow line means to maintain an existing air pressure in said tire, and control means for inflating and deflating said tire across said isolating valve means, the improvement comprising: said isolating valve means including housing means having upstream and downstream ends with respect to the direction of flow from said source to said tire and a single flow passageway therethrough between said ends, means providing a valve seat in said housing means intermediate said ends, pneumatically actuable valve element means in said housing having upstream and downstream surface areas, said value element means including poppet valve member means displaceable relative to said seat and providing said downstream surface area, air under pressure in said tire acting against said downstream surface area to normally close said poppet valve member means against said seat, said valve element means further including pneumatically displaceable diaphragm means providing said upstream surface area and tubular push rod means having an upstream end attached to said diaphragm and a downstream end engaging said poppet valve member, said diaphragm means having a central aperture opening into said upstream end of said tubular push rod means, said poppet valve member means being displaceable away from said seat by said push rod means in response to air under pressure from said source against said upstream surface area of said valve element means, and said upstream and downstream surface areas having a ratio of from about 1.25:1 to about 2.5:1.

22. The improvement according to claim 21, wherein said central aperture in said diaphragm means and said tubular push rod means provide a flow passageway there-through to said valve member means, said valve member means has an open position relative to said seat and providing an annular passageway therebetween having a first area, and said flow passageway has a second area less than said first area.

23. The improvement according to claim 22, wherein said second area is about 20% of said first area.

24. The improvement according to claim 22, wherein said second area is from about 15% to about 25% of said first area.

25. The improvement according to claim 22, wherein said poppet valve member has a frusto-conical closed upstream end and a cylindrical wall extending downstream therefrom and providing an internal passageway, said frusto-conical end engaging said valve seat and having flow ports opening radially therethrough downstream of said seat and into said internal passageway.

26. The improvement according to claim 25, wherein said means providing said valve seat includes annular seal means engaged by said frusto-conical end.

27. The improvement according to claim 25, wherein said second area is from about 15% to about 25% of said first area.

28. The improvement according to claim 27, and spring means biasing said poppet valve member toward said seat.

29. The improvement according to claim 28, wherein said means providing said valve seat includes annular seal means engaged by said frusto-conical end.

* * * * *